United States Patent
Shevade et al.

(10) Patent No.: US 11,860,900 B2
(45) Date of Patent: *Jan. 2, 2024

(54) LOG-BASED DISTRIBUTED TRANSACTION MANAGEMENT

(71) Applicant: Amazon Technologies, Inc., Seattle, WA (US)

(72) Inventors: Upendra Bhalchandra Shevade, Herndon, VA (US); Gregory Rustin Rogers, Reston, VA (US); Christopher Ian Hendrie, Centreville, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/722,218

(22) Filed: Apr. 15, 2022

(65) Prior Publication Data

US 2022/0245174 A1    Aug. 4, 2022

Related U.S. Application Data

(60) Division of application No. 15/904,590, filed on Feb. 26, 2018, now Pat. No. 11,308,127, which is a (Continued)

(51) Int. Cl.
*G06F 16/28* (2019.01)
*G06F 16/23* (2019.01)

(52) U.S. Cl.
CPC ........ *G06F 16/283* (2019.01); *G06F 16/2358* (2019.01)

(58) Field of Classification Search
CPC .................. G06F 16/283; G06F 16/2358
See application file for complete search history.

(56) References Cited

U.S. PATENT DOCUMENTS

| 5,335,343 A | 8/1994 | Lampson et al. |
| 6,018,739 A | 1/2000 | McCoy et al. |

(Continued)

FOREIGN PATENT DOCUMENTS

| CN | 101184106 | 5/2008 |
| CN | 103365652 | 10/2013 |

(Continued)

OTHER PUBLICATIONS

"ChainReaction: a Causal + Consistent Datastore based on Chain Replication" Sergio Almeida, et al., ACM, Apr. 15-17, 2013, pp. 85-98.

(Continued)

*Primary Examiner* — William Spieler
(74) *Attorney, Agent, or Firm* — Robert C. Kowert; Kowert, Hood, Munyon, Rankin & Goetzel, P.C.

(57) ABSTRACT

For a given cross-data-store transaction request at a storage service, a coordinator transmits respective voting transition requests to a plurality of log-based transaction managers (LTMs) configured for the respective data stores to which writes are directed in the transaction. The LTMs transmit responses to the coordinator based on data-store-specific conflict detection performed using contents of the voting transition requests and respective data-store-specific state transition logs. The coordinator determines a termination status of the cross-data-store transaction based on the LTMs' responses, and provides an indication of the termination status to the LTMs.

20 Claims, 11 Drawing Sheets

Related U.S. Application Data continuation of application No. 14/657,043, filed on Mar. 13, 2015, now Pat. No. 9,904,722.

(56) References Cited

U.S. PATENT DOCUMENTS

| | | | |
|---|---|---|---|
| 7,290,056 | B1 | 10/2007 | McLaughlin, Jr. |
| 7,668,876 | B1 | 2/2010 | Kulkarni |
| 7,730,034 | B1 | 6/2010 | Deflaux et al. |
| 7,949,662 | B2 | 5/2011 | Arber et al. |
| 8,055,711 | B2 | 11/2011 | Fachan et al. |
| 8,078,582 | B2 | 12/2011 | Wang et al. |
| 8,108,343 | B2 | 1/2012 | Wang et al. |
| 8,510,270 | B2 | 8/2013 | Pareek et al. |
| 8,548,945 | B2 | 10/2013 | Dwyer et al. |
| 8,650,155 | B2 | 2/2014 | Corbin et al. |
| 8,676,752 | B2 | 3/2014 | Kundu et al. |
| 9,454,670 | B2 | 9/2016 | Beecham |
| 9,519,510 | B2 | 12/2016 | Strauss et al. |
| 9,519,674 | B2 | 12/2016 | Vermuelen et al. |
| 9,529,882 | B2 | 12/2016 | Vermeulen |
| 9,569,459 | B1 | 2/2017 | Strauss et al. |
| 9,613,078 | B2 | 4/2017 | Vermeulen et al. |
| 9,619,278 | B2 | 4/2017 | Vermeulen |
| 9,619,544 | B2 | 4/2017 | Vermeulen et al. |
| 9,639,589 | B1 | 5/2017 | Theimer et al. |
| 9,799,017 | B1 | 10/2017 | Vermeulen et al. |
| 9,870,384 | B2 | 1/2018 | Cain, III et al. |
| 9,904,722 | B1 | 2/2018 | Shevade et al. |
| 9,984,139 | B1 | 5/2018 | Ye et al. |
| 10,025,802 | B2 | 7/2018 | Vermeulen et al. |
| 10,109,148 | B2 | 10/2018 | Risnoveanu et al. |
| 10,282,228 | B2 | 5/2019 | Vermeulen |
| 10,296,606 | B2 | 5/2019 | Vermeulen et al. |
| 10,303,795 | B2 | 5/2019 | Vermuelen et al. |
| 10,373,247 | B2 | 8/2019 | Vermeulen et al. |
| 10,866,865 | B1 | 12/2020 | Morkel et al. |
| 10,866,968 | B1 | 12/2020 | Cole et al. |
| 11,048,669 | B2 | 6/2021 | Deardeuff et al. |
| 11,308,127 | B2 | 4/2022 | Shevade et al. |
| 2006/0182050 | A1 | 8/2006 | Dohm |
| 2006/0268742 | A1 | 11/2006 | Chu et al. |
| 2007/0162516 | A1 | 7/2007 | Thiel et al. |
| 2008/0028009 | A1 | 1/2008 | Ngo |
| 2008/0040628 | A1 | 2/2008 | Mandal |
| 2009/0157766 | A1 | 6/2009 | Shen et al. |
| 2009/0172695 | A1 | 7/2009 | Lazaroff et al. |
| 2010/0198855 | A1 | 8/2010 | Ranganathan et al. |
| 2010/0211554 | A1 | 8/2010 | Reid et al. |
| 2010/0257138 | A1 | 10/2010 | Wang et al. |
| 2010/0332448 | A1 | 12/2010 | Holenstein et al. |
| 2011/0041006 | A1 | 2/2011 | Fowler |
| 2011/0178985 | A1 | 7/2011 | San Martin Arribas |
| 2011/0208822 | A1 | 8/2011 | Rathod |
| 2011/0225293 | A1 | 9/2011 | Rathod |
| 2011/0264710 | A1 | 10/2011 | Arunagiri et al. |
| 2012/0059792 | A1 | 3/2012 | Kundu et al. |
| 2012/0075450 | A1 | 3/2012 | Ding et al. |
| 2012/0131058 | A1 | 5/2012 | Farber |
| 2012/0166407 | A1 | 6/2012 | Lee et al. |
| 2012/0303576 | A1 | 11/2012 | Calder et al. |
| 2013/0007069 | A1 | 1/2013 | Chaliparambil et al. |
| 2013/0080480 | A1 | 3/2013 | Mao |
| 2013/0110767 | A1 | 5/2013 | Tatemura et al. |
| 2013/0262423 | A1 | 10/2013 | Graefe et al. |
| 2013/0304714 | A1 | 11/2013 | Lee et al. |
| 2014/0006362 | A1 | 1/2014 | Noronha et al. |
| 2014/0074882 | A1 | 3/2014 | Vyvyan |
| 2014/0156618 | A1 | 6/2014 | Castellano |
| 2015/0186043 | A1 | 7/2015 | Kesselman et al. |
| 2015/0339154 | A1 | 11/2015 | Wen et al. |
| 2015/0370767 | A1 | 12/2015 | Sevilmis |
| 2015/0378774 | A1 | 12/2015 | Vermeulen |
| 2016/0085772 | A1 | 3/2016 | Vermeulen et al. |
| 2016/0196295 | A1 | 7/2016 | Bhattacharjee et al. |
| 2016/0350392 | A1 | 12/2016 | Rice et al. |
| 2017/0206240 | A1 | 7/2017 | Vermeulen et al. |
| 2018/0047002 | A1 | 2/2018 | Vermeulen et al. |
| 2018/0322149 | A1 | 11/2018 | Vermeulen et al. |
| 2018/0329936 | A1 | 11/2018 | Cole et al. |

FOREIGN PATENT DOCUMENTS

| | | |
|---|---|---|
| JP | H06243072 | 9/1994 |
| JP | H09204341 | 8/1997 |
| JP | 2004518335 | 6/2004 |
| JP | 2010152559 | 7/2010 |
| JP | 2011076487 | 4/2011 |
| WO | 2013062894 | 5/2013 |

OTHER PUBLICATIONS

"Chain Replication in Theory and in Practice", Scott Lystig Fritchie, ACM, Sep. 30, 2010, pp. 1-11.

"Chain Replication for Supporting High Throughput and Availability", Robbert van Renesse, Fred B. Schneider, USENIX Association OSDI '04: 6th Symposium on Operating Design and Implementation, 2004, pp. 91-104.

Invitation to Pay Additional Fees for PCT/US2015/049470, dated Dec. 1, 2015, Amazon Technologies, Inc., pp. 1-10.

Ozgur Ulusoy, "Processing Real-Time Transactions in a Replicated Datebase System", Distributed and Parallel Datebases, vol. 2, No. 4, Sep. 10, 1993, pp. 405-436.

Philip A. Bernstein, et al., "Concurrency Control and Recovery in Database Systems", Retrieved from the Internet URL: https://courses.cs.washington.edu/courses/cse490h/11wi/CSE490H_files/CSE550BHG-Ch7.pdf, Jan. 1987, pp. 1-58.

International Search Report and Written Opinion, dated Dec. 7, 2015, Amazon Technologies, Inc., pp. 1-11.

U.S. Appl. No. 14/753,475, filed Jun. 29, 2015, Allan Henry Vermeulen, et al.

U.S. Appl. No. 14/753,505, filed Jun. 29, 2015, Allan Henry Vermeulen, et al.

Divyakant Agrawal, et al, "Managing Geo-replicated Data in Multi-datacenters", Springer Berlin Hiedelberg, vol. 7813 Mar. 25, 2013, pp. 23-43.

Gene T.J. Wuu et al., Efficient Solutions to the Replicated Log and Dictionary Problems, Reprinted with permission from the 3rd PODC Converence Proceedings, ACM 1984, pp. 57-66.

Michael Lawrence, "Mulitobjective Genetic Algorithms for Materialized View Selection in OLAP Data Warehouse", GECCO'06, ACM, Jul. 8-12, 2006, pp. 699-706.

LOG-BASED DISTRIBUTED TRANSACTION MANAGEMENT

This application is a divisional of U.S. patent application Ser. No. 15/904,590, filed Feb. 26, 2018, which is a continuation of U.S. patent application Ser. No. 14/657,043, filed Mar. 13, 2015, now U.S. Pat. No. 9,904,722, which are hereby incorporated by reference herein in their entirety.

BACKGROUND

In recent years, more and more computing applications are being implemented in distributed environments. A given distributed application may, for example, utilize numerous physical and/or virtualized servers spread among several data centers of a provider network, and may serve customers in many different geographical locations. In many cases, particularly in cloud-based computing environments, a given application may involve performing reads and writes at several different data stores, such as various instances of relational databases, non-relational databases, and the like. Some commonly used data store architectures may support the traditional ACID (atomicity, consistency, isolation and durability) properties associated with the relational data model for operations within a given data store, but may not support such properties for groups of operations involving multiple data stores. Other data store architectures may not natively support the ACID property even within groups of operations directed to a single data store instance.

Developers of applications that would benefit from support for transactions that cross data store boundaries are sometimes forced to implement their own transaction management mechanisms. Such ad-hoc mechanisms are often hard to maintain, especially as new versions of the member data stores of the distributed environment evolve over time, and as more features are added to the distributed applications themselves. Furthermore, given the network delays and various types of failures that may be encountered in typical provider networks over time, some such transaction management techniques may not be robust enough to support the service levels required for mission-critical operations.

Figure 1:
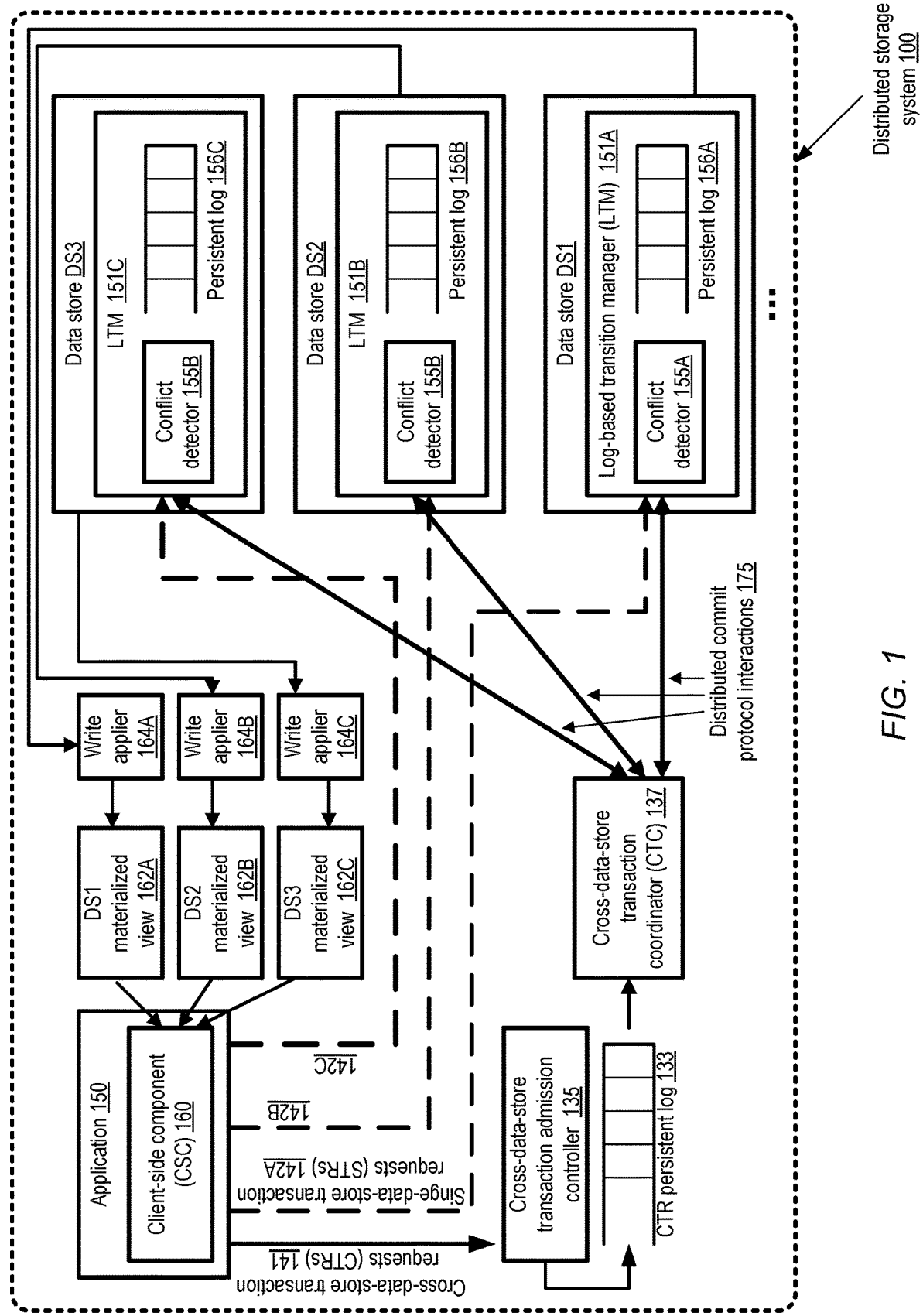
FIG. 1 illustrates an example distributed storage system environment in which transactions directed to various combinations of data stores are managed using a plurality of persistent logs for state transition records, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing distributed transactions using log-structured repositories of state transition records and a hybrid approach involving aspects of optimistic and pessimistic concurrency control mechanisms are described. The term "distributed transaction", as used herein, refers to an atomic unit of work that comprises storage operations (e.g., reads and/or writes) directed to a plurality of data stores. Thus, for example, with respect to a given distributed transaction comprising one or more writes, either all the included writes are committed using the techniques described herein, or none of the included writes are committed, regardless of the number of distinct data stores involved or the types of data stores involved. Distributed transactions may also be referred to herein as "cross-data-store" transactions, in contrast to "single-data-store" transactions within each of which storage operations are directed to only a single data store. Cross-data-store transactions involving a wide variety of data store types may be supported in various embodiments, such as instances of relational database systems, non-relational databases, collections of storage objects implemented at an object storage service providing a web-services interface, and so on. A group of data stores, such as an instance RD-inst1 of a relational database system and an instance NRD-inst1 of a non-relational database system, may be registered as member stores of a storage system for which atomic cross-data-store transactions are to be supported.

A given cross-data-store transaction may include several lower level modification operations, each of which may be considered a different state transition at a respective member store of the storage system in at least some embodiments. In some such embodiments, at least one persistent log-structured repository may be established to store records of cross-data-store transaction requests (CTRs) generated by client-side components of the storage system. Such client-side components may include, for example, application programs that utilize client libraries supported by the storage system to prepare and submit transaction requests. The CTR repository may be deemed log-structured in that entries may typically be logically appended to the repository, e.g., in order of corresponding acceptance decisions. In at least some implementations, the order of acceptance of the CTRs may be indicated by respective sequence numbers included in the entries of the repository. Such a repository may also be referred to herein as a "persistent log" for CTRs. At any given point in time, the CTR repository may represent the accumulated transitions of a state machine representing the sequence of cross-data-store transactions received and accepted for processing at the data store. Other similar log-structured repositories or persistent logs may also be established for state transitions at each member data store and used for local (i.e., data-store-level) conflict detection in some embodiments as described below in further detail. The terms "persistent log" and "log-structured repository" may be used synonymously herein.

In some embodiments, a decision as to whether to accept or reject a CTR submitted by a client-side component may be made by a cross-data-store transaction admission controller of the storage system. A given CTR may include a number of different constituent elements in various embodiments as described below. These elements may include, for example, descriptors or entries representing write sets and write payloads of the transaction, corresponding read sets indicative of the data store objects on which the writes depend, logical constraint descriptors (e.g., to support idempotency of transactions and sequencing between transactions) and so on. The admission controller may perform one or more validation checks (e.g., to ensure that the requested CTR is not a duplicate of an earlier-submitted CTR and/or to ensure that the requested CTR does not violate transaction sequencing constraints) to determine whether to accept the CTR for further processing. If the CTR is accepted for processing, a record or entry corresponding to the CTR may be stored in the CTR log. It is noted that the cross-data-store transaction admission controller may not perform read-write conflict detection in at least some embodiments; instead, as described below, read-write conflict detection may be performed separately for individual data stores involved in the transaction.

One or more cross-data-store transaction coordinators (CTCs) may be established to examine the entries of the CTR log in the order in which they were inserted in some embodiments. For each CTR examined, a CTC may coordinate a simplified two-phase commit (2PC) protocol to determine whether the changes indicated in the CTR are to be made permanent or not. In the first phase, the CTC may unpack the CTR and generate respective voting transition requests (VTRs) to be transmitted to local log-based transaction managers (LTMs) of the data stores to which storage operations of the CTR are directed. For example, if a given CTR includes writes W1 and W2 directed to two data stores DS1 and DS2, the CTC may generate respective VTRs VTR1 and VTR2 and transmit them to the LTMs of DS1 and DS2 respectively. Each VTR may include data-store level elements similar to the elements of the CTRs—e.g., a read set pertaining to one data store, a write set pertaining to the data store, and so on. In at least some embodiments, the LTMs may be responsible not only for participating in the 2PC protocol with respect to cross-data-store transactions, but also for responding to single-data-store transaction requests directed to the member data stores as described below.

Upon receiving a VTR, in some embodiments an LTM may perform read-write conflict detection and/or one or more logical constraint checks to determine whether the VTR should be accepted or rejected. For example, the VTR may indicate a read set comprising one or more storage objects on whose values the writes of the VTR depend—that is, the writes of the VTR may have been generated on the basis of the values of the read set objects at the time the CTR was generated by the client-side component. If the LTM is able to determine, based on an analysis of the VTR elements and at least a subset of previously-committed transition records in its persistent log, that none of the read set objects have been modified since the CTR was generated, the VTR may be conditionally accepted in some embodiments. The acceptance may be conditional in the sense that the final disposition of the writes of the VTR (e.g., whether the writes are to be committed or aborted) may have to wait until the second phase of the 2PC protocol, during which the CTC sends a terminating transition request (TTR) indicating the commit or abort decision. To conclude the first phase of the 2PC protocol, the LTM at each data store involved in the transaction may send a respective "vote" response to the CTC, indicating whether the VTR transmitted to the LTM was conditionally accepted or not. In at least some embodiments, a record of the conditionally accepted VTR may be appended or inserted in the persistent log of the LTM. If the VTR cannot be accepted by an LTM (e.g., due to a read-write conflict or a logical constraint violation), the "vote" response may indicate that the VTR was rejected.

During the period between the conditional acceptance of the VTR and the receipt by the LTM of a corresponding commit/abort TTR, in at least some embodiments, the record of conditional acceptance may be treated as the logical equivalent of a write lock on the read set and the write set of the VTR. During this period, a single-data-store transaction request (or another VTR) that attempts to modify the conditionally-accepted VTR's read/write sets may not be accepted by the LTM. Thus, the LTM may perform conflict detection between newly-received transition requests and the record of the conditionally-accepted VTR (as well as the records of previously-committed transitions) during the period pending the receipt of the TTR. In some embodiments, any conflicting transitions may be rejected immediately, while on other embodiments the processing of the conflicting transition requests may be deferred until the 2PC operations for the conditionally-accepted VTR are completed.

Meanwhile, the responses from the various LTMs to the VTRs may be collected by the CTC. The first phase of the 2PC protocol may be considered complete when all the responses are received (or if a timeout occurs, which may be considered the equivalent of an abort response). If all the LTMs conditionally accepted their VTRs, the CTC may send a commit request as the TTR to each of the LTMs as part of the second phase of the 2PC protocol. If at least one LTM did not conditionally accept a VTR, the CTS may instead send an abort TTR. If a commit TTR is received, an LTM may unconditionally commit the corresponding VTR changes that were previously conditionally accepted—e.g., by modifying a field in the transition record or "lock" record that was stored for the VTR originally and converting the record to a committed transition record. The write payloads of the committed transitions may eventually (or synchronously) be propagated or applied to the storage devices of the data stores and/or additional write destinations such as materialized views of the data stores in various embodiments. If an abort TTR is received rather than a commit, the previously conditionally-accepted changes may be discarded (or simply ignored) without making them permanent. Regardless of the nature of the TTR that is received, the logical lock on the read/write set of the VTR may be released by the LTM.

As mentioned earlier, the LTMs may continue to receive and process single-data-store transaction requests (STRs) during the phases of the 2PC protocol in at least some embodiments. With respect to acceptance/rejection decisions, an STR may be treated by an LTM in a manner similar to a VTR—that is, the transaction represented by the STR may be considered to comprise a single transition since it only applies to one data store. The contents of the STRs may include read sets, write sets and logical constraint descriptors for the particular data store to which they are directed. The LTM may perform conflict detection with respect to the STRs based on the read sets, the previously-committed transition requests and the pending conditionally-accepted VTRs. Details regarding the manner in which read-write conflicts may be detected for STRs and VTRs, as well as the way in which logical constraints such as de-duplication and sequencing constraints are implemented for STRs and VTRs in various embodiments are provided below. At least some of the persistent logs used for CTRs and also for the individual data stores' LTMs may be implemented using groups of geographically dispersed nodes organized as replication DAGs (directed acyclic graphs) in some embodiments as described below' Such replication DAGs may provide a very high level of availability and data durability for the various log entries used for managing the different types of transactions. In at least some embodiments, the implementation of the CTCs and the CTR persistent logs may be optimized for increased throughput, e.g., by setting up respective logs and corresponding CTCs for different combinations of data stores, as also described below in further detail.

In at least some environments, the fraction of VTRs and/or STRs for which read-write conflicts and/or logical constraint violations are detected may typically be quite low. Furthermore, in at least some operating environments, the number of cross-data-store transactions generated per unit time may typically be much smaller than the number of single-data-store transactions. Thus, using the log-based transaction management approach described, the majority of transactions may be committed efficiently, without requiring the overhead of maintaining locks for all the data objects in the various data stores. At the same time, the use of the 2PC technique may ensure the required level of consistency (e.g., sequential consistency) and atomicity for those operations that do involve writes to several different data stores.

In at least some embodiments, one or more optimizations of the basic distributed commit technique described above may be implemented. For example, in one embodiment, multi-data-store read-only transactions (i.e., transactions that include no writes, but read objects of several data stores) may be handled using a single-phase protocol. The CTC may transmit VTRs with null write sets to the LTMs of the data stores to which the reads of the transaction are directed, and if all the LTMs accept the VTRs (e.g., if no logical constraint violations are found by any of the LTMs), a success indicator may be returned to the client-side component that issued the read-only CTR. In another optimization employed in some embodiments, the CTC may decompose at least some cross-data-store transactions into smaller units (e.g., resolving conflicts among the units at the CTC itself, and re-ordering the units if needed) which can each be atomically implemented at a single data store. In at least one embodiment, causal consistency (a weaker levels of consistency than sequential consistency) may be supported for at least some transactions.

Example System Environment

FIG. 1 illustrates an example distributed storage system environment in which transactions directed to various combinations of data stores are managed using a plurality of persistent logs for state transition records, according to at least some embodiments, according to at least some embodiments. As shown, distributed storage system 100 includes a plurality of member data stores such as DS1, DS2 and DS3, each of which has an associated log-based transaction manager (LTM) 151 with a respective conflict detector 155 and a respective persistent log (i.e., a log-structured repository) 156 in which records of state transitions pertaining to that particular data store are placed. For example, LTM 151A with persistent log 156A and conflict detector 155A is associated with DS1, LTM 151B with persistent log 156B and conflict detector 155B is associated with DS2, and LTM 151C with persistent log 156C and conflict detector 155C is associated with DS2 in the depicted system. Distributed transactions spanning instances of a variety of data store architectures may be supported in distributed system 100 in some embodiments—e.g., DS1 may be an instance of a relational database system, DS2 may be an instance of a non-relational database system, DS3 may be comprise a collection of unstructured objects managed by a storage service and accessible via web-services interfaces, and so on. Several instances of the same type of data store may be included in a storage system 100 in some embodiments—e.g., DS1, DS2 and DS3 may each represent a different instance of a relational database system in some cases.

A number of storage-related applications, such as application 150, may include respective client-side components (CSCs) 160 of the storage system, at which transaction requests of various types directed to one or more data stores may be generated. In some embodiments, the distributed storage system may expose a set of transaction-related application programming interfaces (APIs), e.g., in the form of a library, which can be invoked by the CSCs to submit transaction requests. Broadly speaking, the client-side components 160 may generate two categories of transaction requests in the depicted embodiment: single-data-store transaction requests (STRs) 142, and cross-data-store transaction requests (CTRs) 141. An STR 142 may include write operations (and/or reads) directed to a single member data store, while a CTR may include writes (and/or reads) directed to more than one member data store. Thus, for example, STRs 142A whose writes are directed only to DS1 may be sent by client-side component 160 to LTM 151A, STRs 142B with writes directed solely to DS2 may be sent to LTM 151B, and STRs 142C with writes directed only to DS3 may be sent to LTM 151C. Each STR may include, in addition to information about the write sets (the objects being modified) and write payloads (the content of the modifications), a number of addition elements that may be used by the receiving LTM's conflict detector to determine whether the STR is to be accepted or rejected. Such elements may include read sets indicating the objects on which the writes depend, conflict check delimiters (e.g., state indicators or last-modified sequence numbers of the LTM's persistent logs, indicating the most recent state of the data store which was viewed by the CSC when preparing the STR), logical constraint descriptors for managing de-duplication and sequencing among transactions, and so on. Using the contents of the STRs and at least a subset of the transition records already stored in their persistent logs (with the subset being selected based on the conflict check delimiters, for example), a conflict detector 155 may decide to accept an STR for commit, or to reject/abort the STR. Respective transition records comprising at least some of the elements of accepted STRs may be stored in the associated persistent logs 156, e.g., with respective commit sequence numbers indicating the order in which the STRs were accepted.

After a commit transition record corresponding to an STR is stored, the corresponding write payload may be propagated or applied to the storage devices at which the contents of the data stores are located (not shown in FIG. 1), and at least in some cases to additional destinations. Such additional destinations may, for example, include various materialized views 162 of the data stores, such as view 162A of data store DS1, view 162B of data store DS2, and view 1632C of data store DS3. The client-side components may in some embodiments use the materialized views 162 as the sources for their transactions' reads. The committed writes may be propagated to the materialized views 162 via respective write appliers 164 (e.g., 164A, 164B or 164C). In some embodiments, the operations of at least some write appliers 164 may be asynchronous with respect to the insertion of the transition records within the persistent logs 156, while in other embodiments at least some write appliers 164 may propagate the writes synchronously with respect to the insertion of the transition records. The LTMs 151 may provide an indication of the disposition (commit or abort) of the STRs to the client-side components. In some embodiments, transition records corresponding to aborted/rejected STRs may also be stored in the persistent logs.

The client-side component 160 may submit cross-data-store transaction requests 141 (each of which includes writes and/or reads directed to more than one data store) to a transaction admission controller 135 in the depicted embodiment, e.g., instead of transmitting the CTRs to any of the LTMs 151 associated with individual data stores. A given CTR 141 may include a plurality of write sets and corresponding write payloads directed to a respective data store in the depicted embodiment. In addition, a plurality of read sets, conflict check delimiters, and/or logical constraint descriptors may be included in a CTR, as described below with respect to FIG. 2. Some of the logical constraints (such as de-duplication requirements or sequencing requirements) may apply to cross-data-store operations in the depicted embodiment. For example, a de-duplication check may be required from the admission controller 135 to determine whether a CTR with identical elements was previously submitted, or a sequencing check may be required to verify that some specified previous cross-data-store transaction was committed prior to the acceptance of the currently-requested transaction. Other logical constraints included in a CTR may be defined at the individual data-store level in some embodiments, so that the constraint checking may be performed by the LTMs 151 rather than the admission controller 135. In at least some embodiments, while the admission controller 135 may be responsible for verifying that cross-data-store level logical constraints are not violated by a CTR, the admission controller may not be required to perform read-write conflict detection. Instead, read-write conflicts may be detected at the individual data store level by the LTMs during the first phase of a distributed commit protocol as described below. If the admission controller 135 determines that a CTR is to be accepted for further processing using the distributed commit protocol, a transition record corresponding to the CTR may be stored in persistent log 133. In some embodiments, each such transition record of CTR persistent log 133 may comprise a sequence number indicative of the order in which it was inserted, as well as at least some of the elements of the CTR itself.

A distributed commit protocol, similar to a two-phase commit (2PC) protocol may be initiated by a cross-data-store transaction coordinator (CTC) 137 for each of the accepted CTRs in the depicted embodiment. The admission controller 135, associated persistent log 133, and CTC 137 may collectively be referred to as distributed transaction management resources herein. The CTC may examine the CTR transition records of log 133 in the order in which they were inserted in at least some embodiments, and generate a set of voting transition requests (VTRs) corresponding to each examined transition record in the first phase of the distributed commit protocol 175. The number of VTRs generated for a given CTR may equal the number of different data stores to which writes are directed in the CTR in at least some implementations. Thus, for example, if a CTR includes one write directed to DS1 and one write directed to DS2, the CTC 137 may generate two VTRs: VTR1 directed to LTM 151A, and VTR2 directed to LTM 151B. In effect, the CTC 137 may unpack the data-store-specific elements (e.g., write set, write payload, read set, logical constraints) of a CTR 141 which are relevant to DS1, and include those elements in VTR1. Similarly, the data-store-specific elements of the CTR 141 which are relevant to DS2 may be unpacked or extracted from the CTR and included in VTR2 sent to DS2. After transmitting the VTRs to the LTMs 151, the CTC may wait for (typically asynchronous) responses from the LTMs.

In response to receiving a VTR, an LTM 151's conflict detector 155 may perform similar checks as would be performed when an STR 142 is received—e.g., read-write conflicts (if any) with respect to previously-store transition records at the data store's persistent log 156 may be identified, the log may be checked for duplicate transitions and/or sequencing violations, and so on. If no conflicts or violations are identified, the VTR may be conditionally accepted (pending the completion of the distributed commit protocol for which the VTR was generated), and a new transition record indicative of the conditional or pending acceptance of the VTR may be stored in the persistent log 156 of the LTM 151 in some embodiments. In at least one implementation in which sequence numbers are stored in transition records of the persistent log 156, a new sequence number may be added to the record representing the conditional acceptance of the VTR at this stage. The new transition record indicative of a conditional acceptance of a VTR may be considered the logical equivalent of an exclusive lock held on the read/write sets of the VTR until the termination transition request (TTR) of the second phase of the distributed commit protocol is processed at the LTM. In the interim, i.e., until the TTR is received, any new STRs (or VTRs) that conflict with the conditionally accepted VTR (or any of the earlier-stored transition records of the persistent log 156) may be rejected by the conflict detector 155. An indication of whether the VTR was accepted or rejected may be sent back to the CTC 137 as part of the first phase of the protocol.

Upon receiving the responses to the VTRs from the various LTMs 151, the CTC 137 may determine the disposition or fate of the corresponding CTR 141 (and its constituent write operations). If all the responses indicated that the VTRs were conditionally accepted, the CTC 137 may initiate the second phase of the protocol, e.g., by transmitting respective commit TTRs to the LTMs 151. If one or more of the VTRs was rejected (e.g., due to read-write conflicts or logical constraint violations), the CTC 137 may instead send abort TTRs to each of the LTMs 151 to which a VTR had been sent during the first phase. Upon receiving a commit TTR, in at least some embodiments the LTM 151 may store an indication in the corresponding VTR record in its persistent log 156 that the acceptance of the VTR is now unconditional—e.g., the conditional VTR acceptance record may be converted to a commit transition record similar to those created for committed STRs 142. The modifications indicated in the transition record may subsequently be treated just as committed writes of STRs are treated, and the "logical lock" that was set on the VTR's read/write set may be removed. Upon receiving an abort TTR, in at least some embodiments the LTM may also release the logical lock. In some embodiments, the conditional VTR acceptance record that was stored in the persistent log 156 may be modified or deleted as well in response to the receipt of an abort TTR. After receiving the TTRs and performing the corresponding modifications, the LTMs 151 may send an acknowledgement of the TTRs back to the CTC 137. In some embodiments, the CTC 137 may then provide a response to the client-side component 160 to indicate the result of the CTR (e.g., whether it was committed or aborted in the second phase of the distributed commit protocol).

A number of variations of the technique described above may be implemented in various embodiments. As described below with respect to FIG. 8, for example, in some embodiments separate CTCs (and corresponding admission controllers and CTR logs) may be established for CTRs that involve different combinations of data stores. One CTC may be set up solely for transactions involving writes to DS1 and DS2, for example, while another CTC may be set up for transactions involving writes to DS1 and DS3. In at least some embodiments, some or all of the persistent logs (e.g., the CTR persistent log, or the data-store-specific persistent logs) may be implemented using a DAG or replication nodes to provide higher levels of availability and durability. In at least one embodiment, each of the data stores may implement its own programmatic interfaces (e.g., APIs) for reads, and the client-side components may use those APIs to read data instead of relying on materialized views.

Transaction Request Contents

Figure 2:
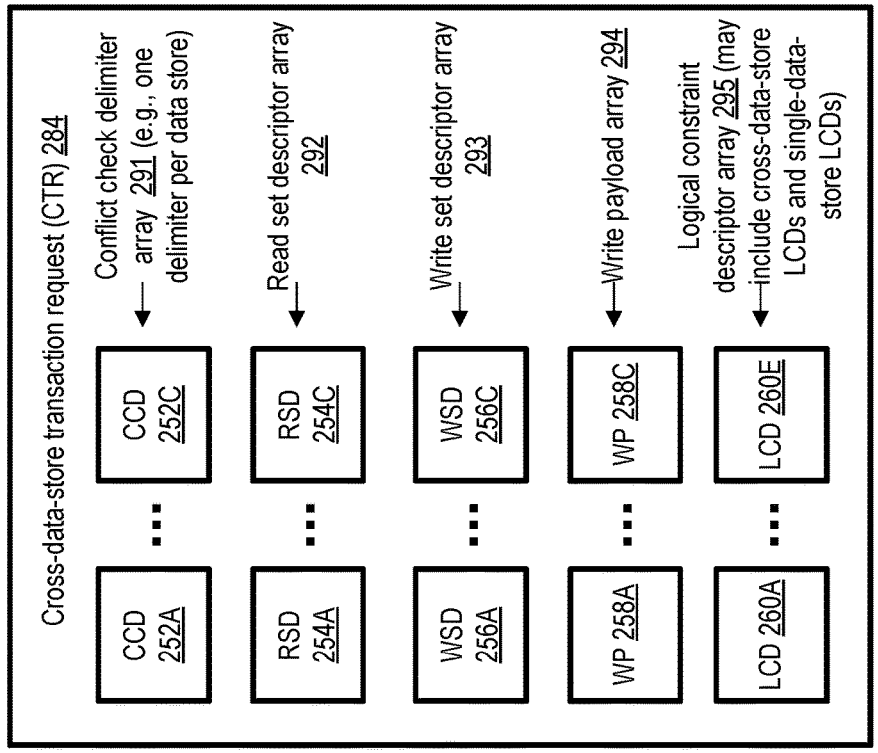
FIG. 2 illustrates example elements of single-data-store transaction requests (STRs) and cross-data-store transaction requests (CTRs) that may be generated by client-side components of a distributed storage service, according to at least some embodiments.
Figure 2:
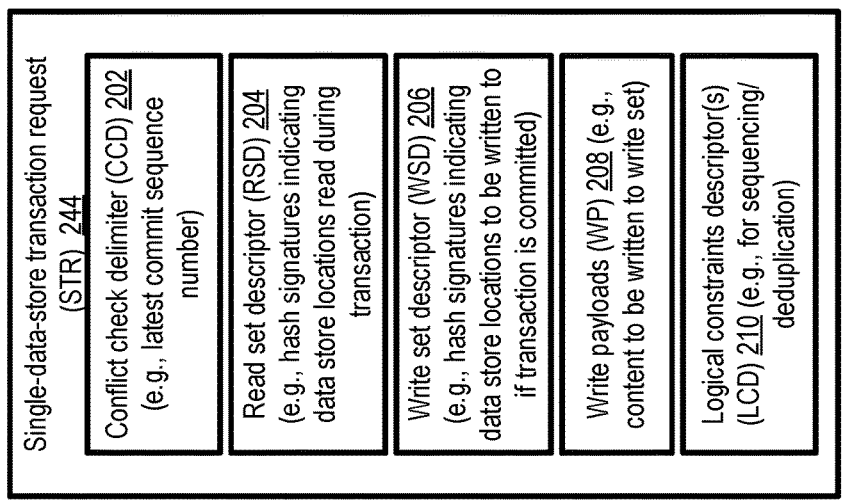

FIG. 2 illustrates example elements of single-data-store transaction requests (STRs) and cross-data-store transaction requests (CTRs) that may be generated by client-side components of a distributed storage service, according to at least some embodiments. As shown, an STR 244 may include a conflict check delimiter (CCD) 202, a read set descriptor (RSD) 204, a write set descriptor (WSD) 206, a write payload (WP) 208 and one or more optional logical constraint descriptors (LCDs) 210 in the depicted embodiment. A client library provided by the distributed storage service may be utilized to assemble or generate the STR 244 and/or the CTR 284 in the depicted embodiment. In at least some embodiments, the client library may automatically record the read locations from which data is read during the transaction, and/or the write location to which data is written. In some implementations, the client library may also obtain, from the data store to which the STR is directed and from which the data indicated in the RSD is read, a corresponding sequence number (SN) of the most recent transition whose writes have been applied at the data store. Such sequence numbers may also be referred to as "commit sequence numbers" herein. In one embodiment, the SN may be retrieved before any of the reads of the STR are issued.

In the depicted embodiment, the SN that represents the state of the data store at the time of the reads may be used as the conflict check delimiter 202. The conflict check delimiter 202 may also be referred to as a committed state identifier, as it represents a committed data store state upon which the requested transaction depends. In some embodiments, a selected hash function may be applied to each of the read locations to obtain a set of hash values to be included in read descriptor 204. Similarly, a selected hash function (either the same function as was used for the read descriptor, or a different function, depending on the implementation) may be applied to the location of the write(s) to generate the write set descriptor 206 in at least one embodiment. In other embodiments, hashing may not be used; instead, for example, an un-hashed location identifier may be used for each of the read and write set entries. The write payload 208 may include a representation of the data that is to be written for each of the writes included in the STR. Optional logical constraints 210 may include signatures that are to be used for duplicate detection/elimination and/or for sequencing specified STRs before or after other transitions, as described below in further detail. Some or all of the contents of the transaction request descriptor 244 may be stored as part of the transition records stored in a persistent log by an LTM to which the STR is directed in some embodiments.

It is noted that the read and write locations from which the read descriptors and write descriptors are generated may represent different storage granularities, or even different types of logical entities in various embodiments. For example, for a data store comprising a non-relational database in which a particular data object is represented by a combination of container name (e.g., a table name), a user name (indicating the container's owner), and some set of keys (e.g., a hash key and a range key), a read set may be obtained as a function of the tuple (container-ID, user-ID, hash key, range key). For a relational database, a tuple (table-ID, user-ID, row-ID) or (table-ID, user-ID) may be used.

In various embodiments, the conflict detector 155 of the LTM 151 to which the STR is directed may be responsible, using the contents of a STR and the persistent log established for the data store, for identifying conflicts between the reads indicated in the STR and the writes indicated in the log. For relatively simple read operations, generating a hash value based on the location that was read, and comparing that read location's hash value with the hash values of writes indicated in the persistent log may suffice for detecting conflicts. For more complex read requests, using location-based hash values may not always suffice. For example, consider a scenario in which a read request R1 comprises the query "select product names from table T1 that begin with the letter 'G'", and the original result set was "Good-product1". If, by the time that a STR whose write W1 is dependent on R1's results is examined for acceptance, the product name "Great-product2" was inserted into the table, this would mean that the result set of R1 would have changed if R1 were re-run at the time the acceptance decision is made, even though the location of the "Goodproduct1" data object may not have been modified and may therefore not be indicated in the write records of the log. To handle read-write conflicts with respect to such read queries, or for read queries involving ranges of values (e.g., "select the set of product names of products with prices between $10 and $20"), logical or predicate-based read set descriptors may be used in some embodiments. The location-based read set indicators described above may thus be considered just one example category of result set change detection metadata that may be used in various embodiments for read-write conflict detection.

A CTR 284 may include, corresponding to each data store that is affected by the storage operations to be performed atomically in the requested transaction, at least some elements similar to those of an STR 244. Thus, for example, if three data stores were read from during the preparation of the CTR, an array 291 of three conflict check delimiters 252A-252C may be included in the CTR. Similarly, an array 292 of read set descriptors 254A-254C, an array 293 of write set descriptors 256A-256C, and/or an array 294 of write payloads 258A-258C may be included. Some logical constraints to be enforced for the transaction may be defined at the cross-data-store level (e.g., to check whether duplicate CTRs were previously sent to the same admission controller 135), while others may be defined at the individual data store level in the depicted embodiment. Accordingly, the array of logical constraint descriptors 295 may comprise more elements 260A-260E than the number of data stores for which read sets or write sets are included. It is noted that the different arrays shown in CTR 284 may not all have the same number of elements—e.g., the number of data stores read may differ from the number of data stores written to, so the RSD array may have a different size than the WSD or WP arrays. It is also noted that although, to simplify the presentation, the elements of CTR 284 are shown as arrays in FIG. 2, other data structures such as linked lists or hash tables may be used in various embodiments to convey similar types of information. In some embodiments, the client-side component that prepares the CTR 284 may not necessarily identify which reads, writes or constraints apply to which specific data store—instead, for example, object identifiers of the read/written objects (e.g., table names or file names) may be used, and the CTC 137 may be responsible for determining the mappings between object names and the data stores. As described below, the CTC may extract the data-store-specific information from a CTR to generate voting transition requests (VTRs) to be directed to the log-based transaction managers of the respective data stores during the distributed commit protocol in at least some embodiments.

Distributed Commit Protocol

Figure 3:
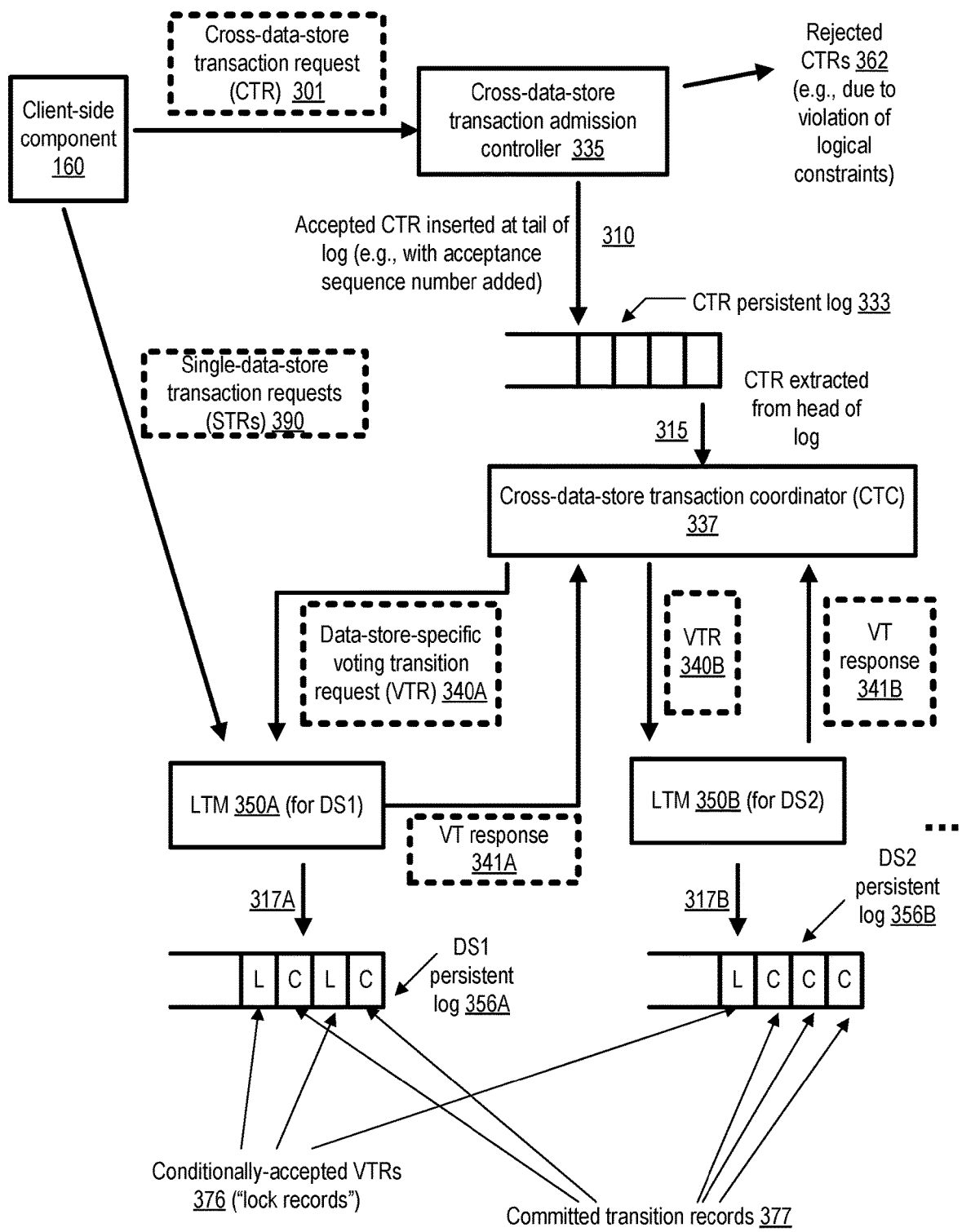
FIG. 3 illustrates example operations that may be performed prior to and during a first phase of a distributed commit protocol implemented for cross-data-store transactions at a storage system, according to at least some embodiments.

FIG. 3 illustrates example operations that may be performed prior to and during a first phase of a distributed commit protocol implemented for cross-data-store transactions at a storage system, according to at least some embodiments. As shown, a client-side component 160 of the storage system may submit STRs 390 directly to the log-based transaction manager (LTM) 350 (such as LTM 350A) of the relevant data store, while cross-data-store transaction requests 301 may instead be directed to an admission controller 335 designated specifically for transactions that involve multiple data stores. Using the contents of the CTR and at least a subset of the CTR persistent log, the admission controller may decide whether to accept or reject a CTR 301.

In at least some embodiments, as mentioned earlier, the admission controller 335 may reject CTRs based on detected violation of idempotency-related (e.g., de-duplication) constraints or sequencing considerations, but may not perform any read-write conflict detection. Rejected CTRs 362 may be discarded in the depicted embodiment by the admission controller 335, e.g., after informing the requesting client-side-component. Corresponding to each CTR that is not rejected, an entry or transition record indicative of the acceptance may be inserted at the tail of CTR persistent log 333 in the depicted embodiment, as indicated by arrow 310. In at least some implementations, a sequence number (e.g., a value of a monotonically-increasing counter or logical clock maintained by the admission controller) may be included in each transition record stored in the log 333. The persistent log 333 may be considered the equivalent of a FIFO (first-in, first-out) queue in the depicted embodiment, into which newly accepted CTR records are inserted at one end (the tail), and from which the CTC 137 extracts records from the other end (the head) as indicated by arrow 315. In some embodiments, instead of dealing with the CTRs stored in persistent log 333 in strict FIFO order, a CTC 137 may be able to process multiple CTRs in parallel under certain conditions. For example, the CTC may be able to examine the contents of the records or entries for two CTRs, CTR1 and CTR2 (e.g., the entry at the head of the log, and the next entry), and determine that the corresponding transactions are directed to non-overlapping portions of the data stores involved and therefore will not conflict with each other. In such scenarios, the CTC 137 may implement the two-phase distributed commit protocol described below at least partly in parallel for CTR1 and CTR2.

In the depicted embodiment, the CTC 337 may be configured to complete both phases of a two-phase distributed commit protocol for a given CTR transition record, before it begins the first phase of the next CTR transition record. During the first phase, the CTC 337 may unpack or extract the constituent elements of the CTR 301 into data-store-specific subgroups, and include one such data-store-specific group of elements in each of one or more voting transition requests (VTR) 340. For example, the read set descriptors, write set descriptors, conflict check delimiters etc. pertinent to data store DS1 may be determined from CTR 301 and included in VTR 340A sent to LTM 350A. Similarly, the read set descriptors, write set descriptors, conflict check delimiters etc. pertinent to data store DS2 may be determined from CTR 301 and included in VTR 340B sent to LTM 350B during the first phase of the protocol.

The conflict detectors of LTMs 350 may examine the submitted VTRs 340 and perform the appropriate read-write conflict detection analysis and/or logical constraint analysis. Corresponding to a VTR 340 for which no conflicts or constraint violations are found, a transition entry 376 indicating conditional acceptance may be stored in the LTM's data-store-specific persistence log 356 (e.g., log 356A in the case of LTM 350A, and log 356B in the case of LTM 350B), as indicated by arrows 317A and 317B. The conditional acceptance entries may represent logical locks (as indicated by the letter "L") that are held on the read/write sets of the VTRs temporarily, pending the receipt of an indication of the disposition of the CTR 301 (i.e., whether the CTR is to be aborted or committed) during the second phase of the distributed commit protocol. VTRs for which read-write conflicts or constraint violations are identified may be rejected by the LTMs 350. Transition entries for rejected VTRs may not be stored in persistent logs 356 in at least some implementations. A respective voting transition response (e.g., response 341A or 341B) may be sent to the CTC 337 from the LTMs 350A and 350B to indicate whether the VTR was conditionally accepted or whether it was rejected based on data-store-specific analysis. After the CTC 337 receives the responses 341, the second phase of the distributed commit protocol may be begun. It is noted that during the pendency of a conditionally-accepted VTR's record, the decision as to whether a given STR 390 is to be accepted at a given LTM may be made based at least in part on conflict detection with respect to the conditionally-accepted VTR (as well as the commit transition records 377 of the logs 356). Similarly, any new VTRs that are received at the LTM during the first phase of the commit protocol may also be checked with respect to read-write conflicts with pending VTRs. Thus, in at least the depicted embodiment, it may sometimes be the case that an STR or a VTR may be rejected on the basis of a particular VTR which never gets committed.

Figure 4A:
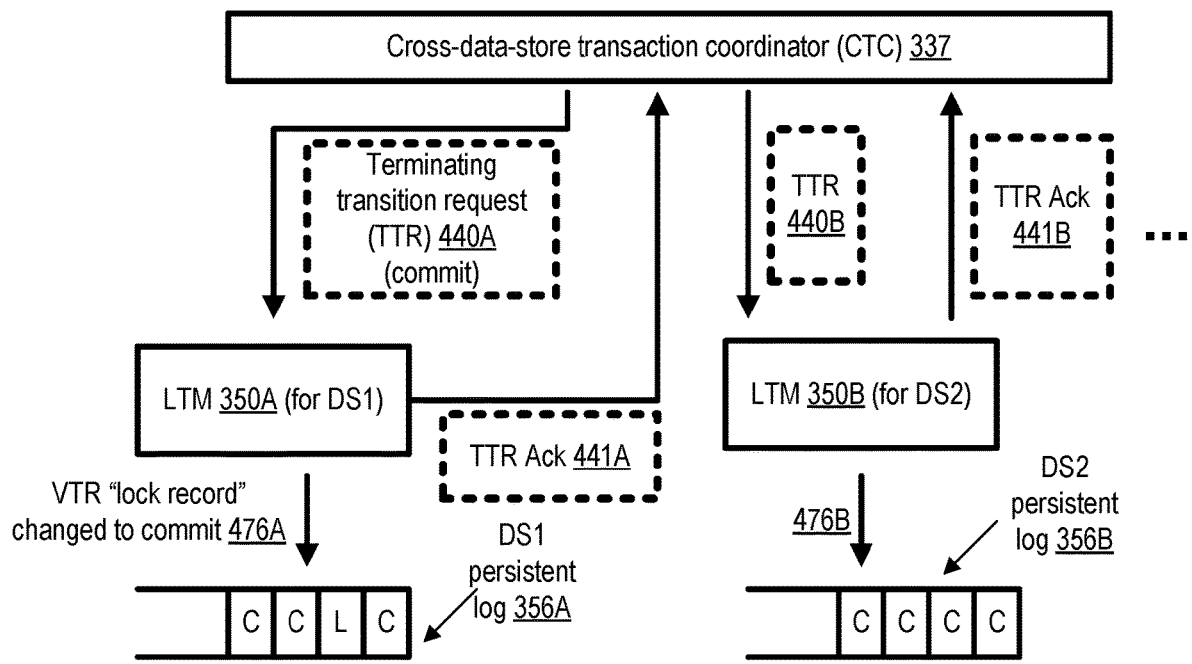
FIG. 4a and FIG. 4b illustrates example operations that may be performed during a second phase of a distributed commit protocol, according to at least some embodiments.
Figure 4B:
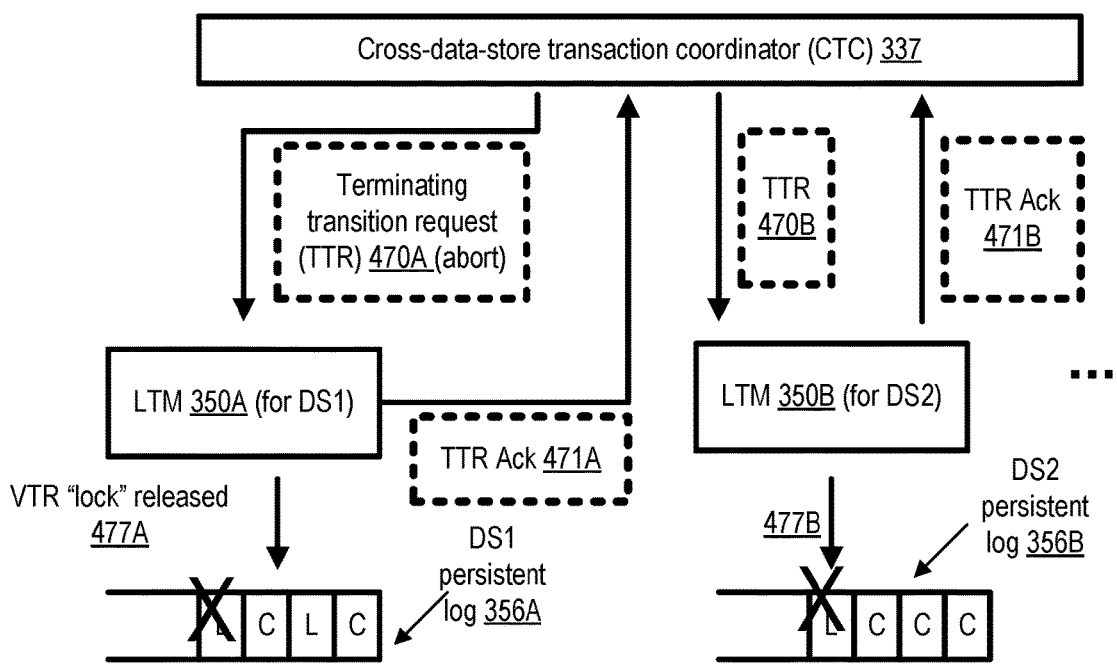

FIG. 4a and FIG. 4b illustrates example operations that may be performed during a second phase of a distributed commit protocol, according to at least some embodiments. Upon receiving the responses to the VTRs from the LTMs of the individual data stores during the first phase of the protocol, the CTC 337 may determine whether at least one of the LTMs rejected a VTR. If none of the VTRs were rejected, the CTC 337 may initiate the second phase by submitting a commit terminating transition request (TTR) 440 to each LTM 350 (e.g., commit TTR 440A to LTM 350A, and commit TTR 340B to LTM 350B), as indicated in FIG. 4a. Upon receiving the commit TTR, an LTM may convert the conditional acceptance or lock transition record for the VTR to a commit transition record, as indicated by the arrows 476A and 476B. In at least some embodiments, after the VTR's record has been modified, an acknowledgement message 441 corresponding to the TTR may be sent to the CTC from the LTMs. The CTC may then inform the client-side component of the result of the CTR to complete the distributed commit protocol, and proceed to initiate the first phase of the commit protocol for the next CTR in the persistent log 433.

If at least one of the LTMs 350 rejects a VTR 340 (or if no response is received from one of the LTMs before a timeout expires), the CTC 337 may determine that the terminating transition of the CTR is to be an abort rather than a commit. Accordingly, respective abort TTRs 470A and 470B may be sent to LTMs 350A and 350B, as indicated in FIG. 4b. Upon receiving an abort TTR 470, in the depicted embodiment the LTM 350 may release the logical lock corresponding to the conditionally-accepted VTR (as indicated by arrows 477A and 477B). In at least some embodiments, the log entries representing the conditionally-accepted VTRs may be modified to indicate the cancellation of the corresponding changes, and/or removed from the persistent logs 356. A respective TTR acknowledgement 471 (e.g., 471A or 471B) may be sent back to the CTC 337 by each LTM, and the CTC may then notify the client-side component of the rejection of the CTR to complete the distributed commit protocol.

In at least one embodiment, some or all of the persistent logs (such as logs 356A and 356B of the data stores DS1 and DS2, and/or CTR persistent log 333) may be implemented using a write-once approach towards log entries, so that any given log entry cannot be modified or overwritten after it is entered into the log. In such implementations, instead of modifying an entry that originally represented a conditionally-accepted VTR, an LTM such as 350A may add a new termination transition entry in the data-store-specific persistent log (e.g., log 356A in the case of LTM 350A) to indicate whether the corresponding CTR was aborted or committed in the second phase of the protocol. The termination transition entry may, for example, include a pointer to the previously-added log entry representing the conditional acceptance of the corresponding VTR. Write appliers associated with the persistent logs of the various data stores may be able to use such termination transition entries to determine whether the writes of the corresponding VTRs are to be applied. In some embodiments, different types of log entries may be stored in the data-store-specific persistent logs for commit transitions of cross-data-store transactions than are stored for single-data-store commit transitions—e.g., a metadata field of a commit log entry may indicate the type of transaction (single-data-store versus cross-data-store) for which the entry is being stored.

Log-Based Conflict Detection and Constraint Checking

Figure 5:
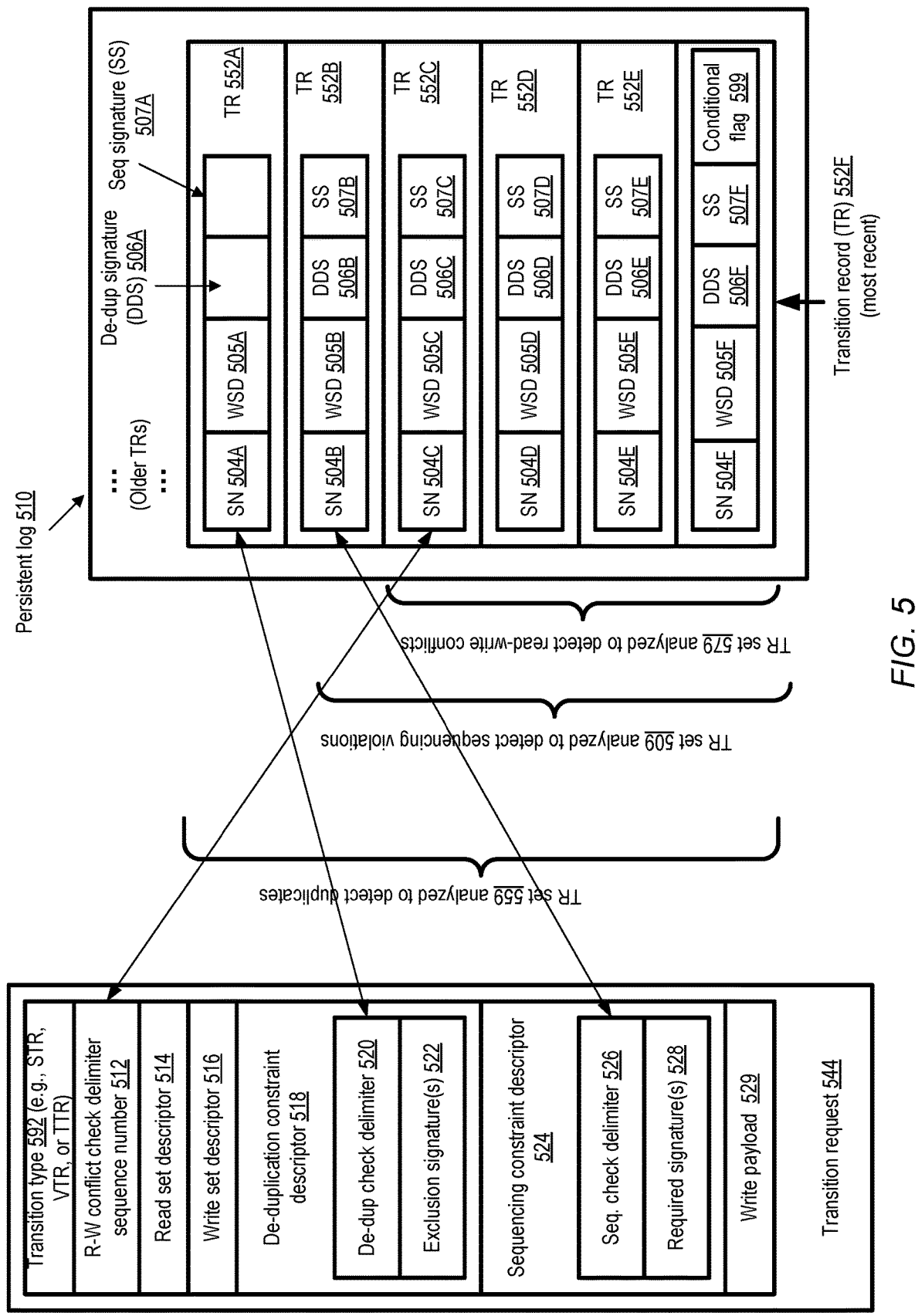
FIG. 5 illustrates examples of the use of transition request elements in conjunction with selected subsets of persistent log records for conflict detection and logical constraint management, according to at least some embodiments.

As mentioned earlier, in at least some embodiments the conflict detectors of the LTMs may examine portions of their persistent logs to determine whether transition requests (e.g., STRs or VTRs) are to be accepted or rejected. Over time, the number of entries stored in the logs may become quite large, and it may become inefficient to examine the entire log for each submitted transition request. Accordingly, one or more techniques may be implemented to limit the set of log records that have to be examined for a given transition request. FIG. 5 illustrates examples of the use of transition request elements in conjunction with selected subsets of persistent log records for conflict detection and logical constraint management, according to at least some embodiments. In the depicted embodiment, a transition request 544 may belong to one of three categories: a VTR (voting transition request), an STR (a single-data-store transaction) or a TTR (a terminating transition request). The category of the transition request may be indicated in transition type element 592. As discussed earlier, STRs may be generated by client-side components of the storage service and transmitted directly to LTMs of the appropriate data stores. In contrast, in various embodiments VTRs and TTRs may be generated by cross-data-store transaction coordinators, e.g., using data-store-specific elements extracted from CTRs for which records have been stored in a CTR log, and transmitted to the appropriate LTMs.

The decision as to whether to accept or reject the transition request 544 may be made on the basis of three types of analyses in the depicted embodiment: read-write conflict detection, duplication detection, and/or transition sequencing considerations. Transition records (TRs) 552 indicative of state transitions (e.g., writes) that have been applied at a given data store may be stored in sequence number order (i.e., in the order in which the writes were committed or applied) in persistent log 510. Thus, TR 552F represents the latest (most recent) state transition applied at the data store, while TRs 552A-552E represent earlier transitions in the order in which they were applied, with TR 552A being the least recent among the six TRs 552A-552F. Each TR 552 may include at least an indication of a sequence number (SN) 504 and a write set descriptor (WSD) 505 of the corresponding transition. In addition, each TR 552 may also include a de-duplication signature 506 and/or a sequencing signature 507 in the depicted embodiment. At least some transition records of log 510 may also include an element (e.g., conditional flag 599 of TR 552F) to indicate that they represent conditionally accepted VTRs. In some embodiments, the TRs 552 may also include read set descriptors of the corresponding transition requests.

As implied by the name, a read-write conflict may be said to occur if the read set (on the basis of which the write set and/or write payload may have been generated) of the requested transition has changed (or has a non-zero probability of having been changed) since the transition request was generated. The transition request 544 may include respective indications or descriptors 514 and 516 of the read set and the write set of the transition. In addition, a read-write conflict check delimiter 512 (e.g., a sequence number representing the last committed transition of the data store as of the time the contents of the read set were examined by the client-side component) may also be included in the transition request 544. Such a delimiter 512 may be used by the conflict detector of the LTM to identify the subset 579 of the TRs that have to be examined for read-write detection. For example, if the delimiter 512 indicates that all the changes represented by serial numbers smaller than SN 504C had already been committed at the data store before the transition request (or the corresponding CTR) was generated, this means that only the TRs 552C, 552D, 552E and 552F (with serial numbers greater than or equal to SN 504C) have to be examined for detecting possible read-write conflicts.

In at least some embodiments, clients of the storage service may wish to enforce idempotency requirements on state transitions, e.g., to ensure that duplicate writes are not applied to one or more of the data stores. In order to avoid duplicate transitions, one or more exclusion signatures 522 (which may also be referred to as de-duplication signatures) may be generated by the client-side component, and included with a de-duplication check delimiter 520 in a de-duplication constraint descriptor 518. To determine whether the requested is a duplicate of an earlier transition, another TR set 559 may be identified, e.g., by the LTM's conflict detector, in the depicted embodiment starting at a sequence number corresponding to de-duplication check delimiter 520, and ending at the most recent transition record 552F. For each of the transition records in set 559, the conflict detector may check whether the de-duplication signature 506 stored in the transition record matches the exclusion signature(s) 522 of the requested transition. If such a match is found, this would indicate that the requested transition is a duplicate. Any of a number of different approaches to the detection of a duplicate transition may be taken in different embodiments. In one embodiment, in which the storage system implements idempotency semantics for transition requests, a duplicate transition request may be treated as follows. While no new work for applying the changes of the transition may be scheduled (since the requested changes have already been committed or conditionally accepted, as indicated by the presence of the match), a success indicator or positive acknowledgement may be provided to the requester of the transition. (Depending on the type of transition which is being checked for duplicates, the requester may be the client-side component or the CTC.) Consequently, in such embodiments, repeated submissions of the same transition request (or transaction request) would have the same net effect as a single submission. Idempotency with regard to duplicates may be especially important in distributed storage systems where network messages (e.g., messages containing transition requests) may sometimes get delayed or dropped, resulting in re-transmissions of the same requests. In other embodiments, a duplicate transition request may be explicitly rejected, e.g., even if no read-write conflicts were detected. If no match is found, and the transition is eventually committed, the transition request's exclusion signature may eventually be stored as the de-duplication signature in the transition record representing the commit.

For some applications, clients may be interested in enforcing a commit order among specified sets of transactions or transitions—e.g., a client that submits three different STRs for transactions T1, T2 and T3 respectively may wish to have T1 committed before T2, and T3 to be committed only after T1 and T2 have both been committed. Such commit sequencing constraints may be enforced using sequencing constraint descriptor 524 in some embodiments. The sequencing descriptor may contain required sequencing signature(s) 528 representing one or more transitions that are expected to be committed prior to the transition represented by request 544, as well as a sequencing check delimiter 526 to demarcate the set of transition records in the log 510 that should be checked for sequencing verification. To determine whether the requested transition's sequencing constraints are met, another TR set 509 may be identified in the depicted embodiment starting at a sequence number corresponding to sequencing check delimiter 526, and ending at the most recent transition record 552F. The conflict detector may have to verify that respective transition records with sequencing signatures that match required signatures 528 exist within TR set 509. If at least one of the required signatures is not found in TR set 509, the sequencing constraint may be violated and the requested transition may be rejected, even if no read-write conflicts were detected. If all the required sequencing signatures are found in TR set 509, and if no read-write conflicts or de-duplication constraint violations that are to result in explicit rejections are detected, the transition may be accepted conditionally (if it is a VTR) or for an unconditional commit (if it is an STR or TTR).

In at least some embodiments, a de-duplication signature 506 may represent the data items written in the corresponding transition in a different way (e.g., with a hash value generated using a different hash function, or with a hash value stored using more bits) than the write set descriptors. Such different encodings of the write set may be used for de-duplication versus read-write conflict detection for any of a number of reasons. For example, for some applications, clients may be much more concerned about detecting duplicates accurately than they are about occasionally having to resubmit transactions as a result of a false-positive read-write conflict detection. For such applications, the acceptable rate of errors in read-write conflict detection may therefore be higher than the acceptable rate of duplicate-detection errors. Accordingly, in some implementations, cryptographic-strength hash functions whose output values take 128 or 256 bits may be used for de-duplication signatures, while simpler hash functions whose output is stored using 16 or 32 bits may be used for the write signatures included in the WSDs. In some scenarios, de-duplication may be required for a small subset of the data stores being used, while read-write conflicts may have to be checked for a much larger set of transitions. In such cases, storage and networking resource usage may be reduced by using smaller WSD signatures than de-duplication signatures in some embodiments. It may also be useful to logically separate the read-write conflict detection mechanism from the de-duplication detection mechanism instead of conflating the two for other reasons—e.g., to avoid confusion among users of the storage service, to be able to support separate billing for de-duplication, and so on. In other embodiments, the write set descriptors may be used for both read-write conflict detection and de-duplication purposes (e.g., separate exclusion signatures may not be used). Similarly, in some embodiments, the same sequence number value may be used as a read-write conflict check delimiter and a de-duplication check delimiter—i.e., the sets of commit records examined for read-write conflicts may also be checked for duplicates. In at least one embodiment, de-duplication may be performed by default, e.g., using the write set descriptors, without the need for inclusion of a logical constraint descriptor in the transition request.

As in the case of de-duplication signatures, the sequencing signatures 507 stored within the TRs 552 may be generated using a variety of techniques in different embodiments. In some embodiments, they may be generated from the write sets of the transitions; in other embodiments, sequencing signatures may be based at least in part on other factors. For example, the identity of the requesting client may be encoded in the sequencing signatures in addition to the write signatures in some embodiments, the clock time at which the transaction was requested may be encoded in the sequencing signatures, or an indication of the location from which the transaction was requested may be encoded, and so on. Similar considerations as described above regarding the use of different techniques for representing de-duplication signatures than write set signatures may apply in some embodiments. Accordingly, in some embodiments, a different technique may be used to generate sequencing signatures than is used for generating write set descriptor contents, even if both the sequencing signatures and the write set signatures are derived from the same underlying write locations. For example, a different hash function or a different hash value size may be used. In other embodiments, however, the write set descriptors may be used for both read-write conflict detection and sequencing enforcement purposes (e.g., separate sequencing signatures may not be used). Similarly, in some embodiments, the same sequence number value may be used as a read-write conflict check delimiter, a de-duplication check delimiter, and/or a sequencing check delimiter—i.e., the sets of commit records examined for read-write conflicts may also be checked for sequencing and de-duplication. In some cases arbitrary numbers or strings unrelated to write sets may be used as sequencing signatures. In some embodiments, in addition to lower bound sequence numbers for the set of TRs to be checked, upper bounds may also be specified within a transition request to indicate the range of TRs that should be examined for constraint checking.

In various embodiments, a cross-data-store transaction admission controller may implement de-duplication and/or sequencing constraint verification using a similar technique as that described above for CTRs, VTRs and TTRs. For example, as indicated in FIG. 2, a given CTR may include one or more transaction-level or cross-data-store logical constraint (e.g., sequencing or de-duplication) descriptors, and the transition records stored in the CTR persistent log may also include cross-data-store sequencing signatures and/or cross-data-store de-duplication signatures. The admission controller may use constraint check delimiters included in the CTR to identify the subset of records of the CTR repository that are to be examined for constraint verification, and reject the CTR if either a de-duplication constraint or a sequencing constraint is violated.

De-duplication constraints and the straightforward sequencing constraints discussed in the context of FIG. 5 represent two specific examples of logical constraints that may be imposed by clients of the storage system on state transitions. In some embodiments, more complex sequencing constraints may be enforced, either at the single-data-store level or at the cross-data-store level. For example, instead of simply requesting the storage service to verify that two transitions T1 and T2 must have been committed (in any order) prior to the requested transition's commit, a client may be able to request that T1 must have been committed prior to T2. Similarly, in some embodiments a client may be able to request negative ordering requirements: e.g., that some set of transitions {T1, T2, Tk} should have been committed before the requested transition in some specified order (or in any order), and also that some other set of transitions {Tp, Ts} should not have been committed.

Example Implementations of Persistent Logs

Figure 6:
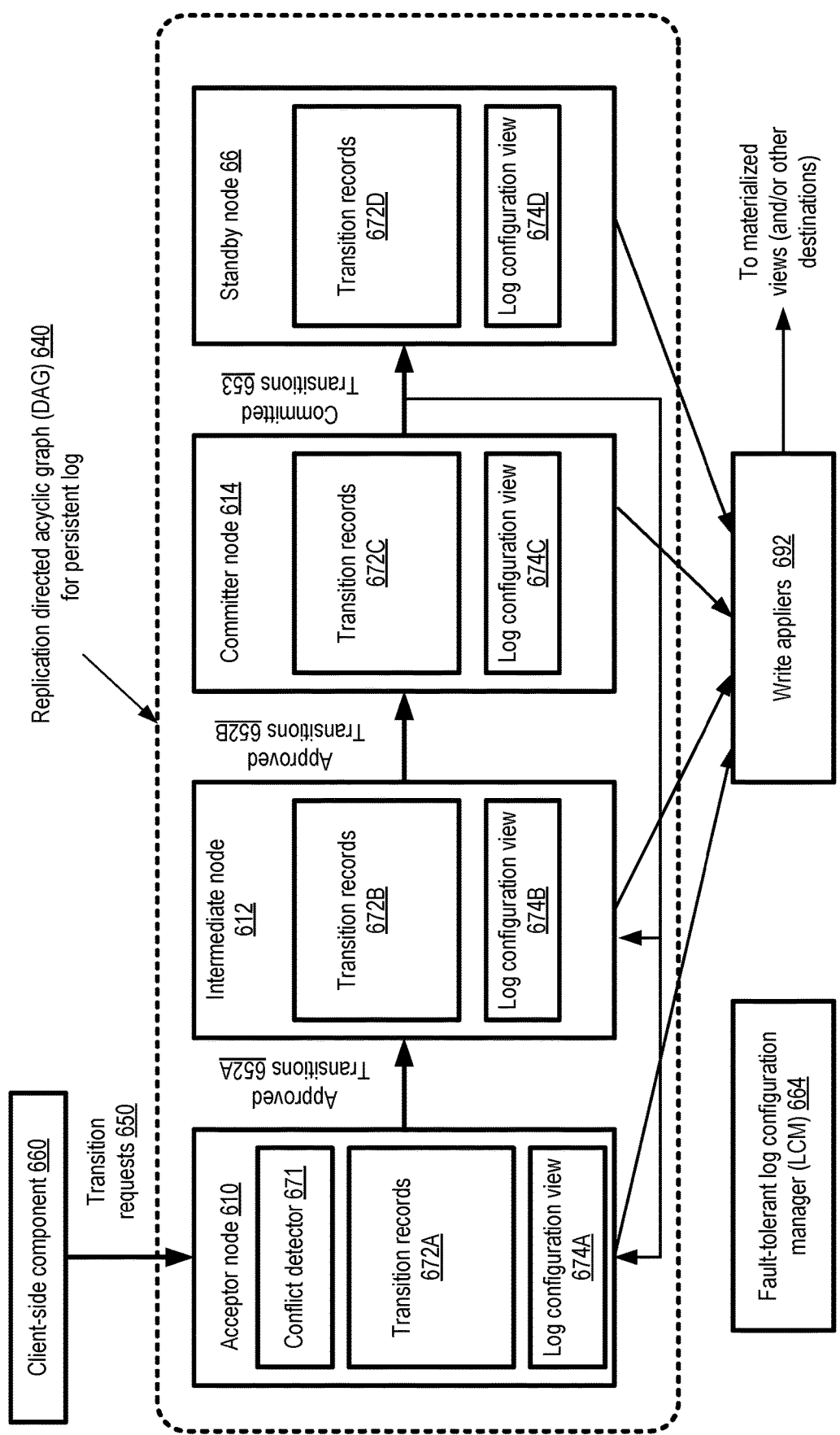
FIG. 6 illustrates an example of a replication DAG (directed acyclic graph) that may be used to implement a persistent log used for transactions associated with the data stores of a storage system, according to at least some embodiments.

In some embodiments, the persistent logs used for individual data stores and/or for CTR transition records may be replicated for enhanced data durability and/or higher levels of availability. FIG. 6 illustrates an example of a replication DAG (directed acyclic graph) that may be used to implement a persistent log used for transitions associated with the data stores of a storage system, according to at least some embodiments. In general, a replication DAG 640 may include one or more acceptor nodes 610 to which transition requests 650 (such as STRs, VTRs, or TTRs) may be submitted, one or more committer nodes 614, zero or more intermediary nodes 612 each positioned along a replication pathway comprising DAG edges leading from an acceptor node to a committer node, and zero or more standby nodes 616 that are configured to quickly take over responsibilities of one of the other types of nodes in the event of a node failure. In some implementations, instead of being incorporated within an acceptor node, the conflict detector may be implemented as a separate entity.

In at least some embodiments, each node of a particular replication DAG such as 640 may be responsible for replicating transition records for the corresponding state machine (e.g., either a state machine of a single data store, or a state machine representing the sequence of cross-data-store transactions processed at the storage service). The transition records may be propagated along a set of edges from an acceptor node to a committer node of the DAG along a replication pathway. In FIG. 6, the current replication pathway starts at acceptor node 610, and ends at committer node 614 via intermediary node 612. For a given transition record, one replica may be stored each of the nodes along the replication path, e.g., in transition sets 672A, 672B and 672C. Each transition record propagated within the DAG may include a respective sequence number or a logical timestamp that is indicative of an order in which the corresponding transaction request was processed (e.g., at the acceptor node 610). When a particular transition record reaches a committer node, e.g., after a sufficient number of replicas of the record have been saved along the replication pathway, the corresponding transition may be explicitly or implicitly committed. If for some reason a sufficient number of replicas cannot be created, the transition records may be removed in some embodiments from the nodes (if any) at which they have been replicated thus far. After the modification has been committed, one or more write appliers 692 may propagate the change to a set of destinations (such as materialized views, or storage devices at which the contents of the data stores are located) that have been configured to receive the state transitions, as described earlier. In some implementations, only a subset of the DAG nodes may be read by the appliers 692 in order to propagate committed writes to their destinations. In other embodiments, the appliers may read commit records from any of the DAG nodes to propagate the changes. In at least one embodiment, write appliers may be implemented as respective threads or processes that may run at the same hosts at one or more of the DAG nodes. In other embodiments, write appliers may run on different hosts than the DAG nodes. A transition record may also be transmitted eventually to standby node 616, and a replica of it may be stored in transition records set 672D after it has been committed, so that the standby node 616 is able to replace a failed node of the DAG quickly if and when such a failover becomes necessary.

A log configuration manager (LCM) 664 may be responsible for managing changes to DAG configuration (e.g., when nodes leave the DAG due to failures, or join/re-join the DAG) by propagating configuration-delta messages asynchronously to the DAG nodes in the depicted embodiment. Each configuration-delta message may indicate one or more changes to the DAG configuration that have been accepted or committed at the LCM 664. In some embodiments, each replication node may implement a respective deterministic finite state machine, and the LCM may implement another deterministic finite state machine. The protocol used for managing DAG configuration changes may be designed to maximize the availability or "liveness" of the DAG in various embodiments. For example, the DAG nodes may not need to synchronize their views of the DAG's configuration in at least some embodiments; thus, the protocol used for transition record propagation may work correctly even if some of the nodes along a replication pathway have a different view of the current DAG configuration than other nodes. In FIG. 6, each of the nodes may update its respective DAG configuration view 674 (e.g., 674A, 674B, 674C or 674D) based on the particular sequence of configuration-delta messages it has received from the LCM 664. It may thus be the case, in one simple example scenario, that one node A of a DAG 640 continues to perform its state transition processing responsibilities under the assumption that the DAG consists of nodes A, B, C and D in that order (i.e., with a replication pathway A-to-B-to-C-to-D), while another node D has already been informed as a result of a configuration-delta message that node C has left the DAG, and has therefore updated D's view of the DAG as comprising a changed pathway A-to-B-to-D. The LCM may not need to request the DAG nodes to pause processing of transitions in at least some embodiments, despite the potentially divergent views of the nodes regarding the current DAG configuration. Thus, the types of "stop-the-world" configuration synchronization periods that may be required in some state replication techniques may not be needed when using replication DAGs of the kind described herein to implement persistent logs for distributed transaction management. Although a linear replication pathway is shown in FIG. 6, in general, a replication pathway may include branches at least at some points of time (e.g., during periods when some DAG nodes have received different configuration delta messages than others). Under most operating conditions, the techniques used for propagating DAG configuration change information may eventually result in a converged consistent view of the DAG's configuration at the various member nodes, while minimizing or eliminating any downtime associated with node failures/exits, node joins or node role changes. It is noted that in some embodiments, the transition records used for distributed transaction management may be stored without using the kinds of replication DAGs illustrated in FIG. 6.

In at least some embodiments, the member nodes of a replication DAG may each be implemented as a respective process or thread running at a respective host or hardware server. The hosts themselves may be physically dispersed, e.g., within various data centers of a provider network. Networks set up by an entity such as a company or a public sector organization to provide one or more services (such as various types of multi-tenant and/or single-tenant cloud-based computing or storage services) accessible via the Internet and/or other networks to a distributed set of clients or customers may be termed provider networks in this document. Provider networks may also be referred to as "public cloud" environments. Some or all of the data stores for which distributed transaction support is provided using the techniques described herein may be established using network-accessible database services and/or other storage services of a provider network in some embodiments.

In one embodiment, a provider network at which support for distributed transactions is implemented may be organized into a plurality of geographical regions, and each region may include one or more availability containers, which may also be termed "availability zones" herein. An availability container in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container.

Figure 7:
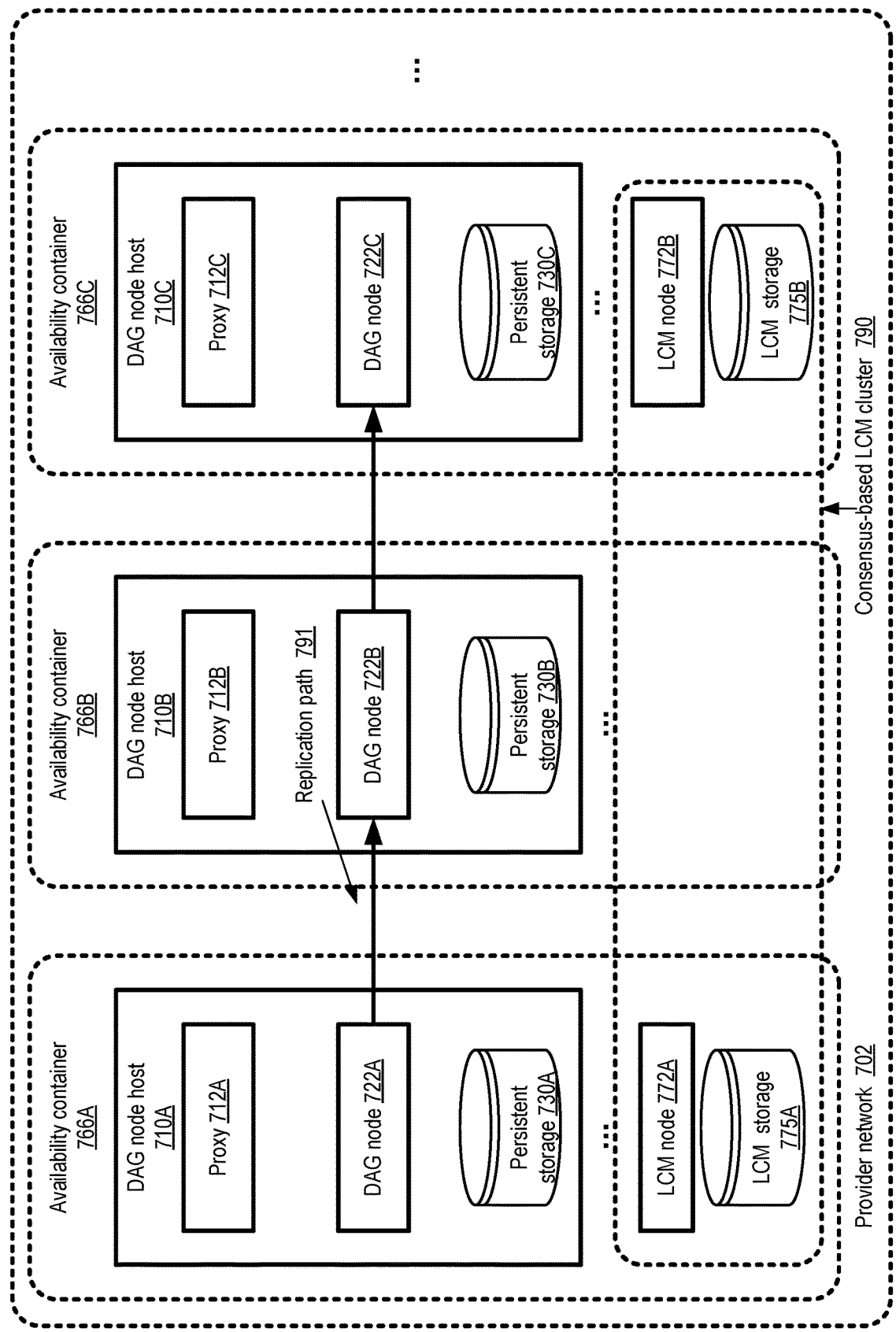
FIG. 7 illustrates an example of a distribution of nodes of a persistent log's replication DAG across multiple availability containers of a provider network, according to at least some embodiments.

FIG. 7 illustrates an example of a distribution of nodes of a persistent log's replication DAG across multiple availability containers of a provider network, according to at least some embodiments. Provider network 702 includes three availability containers 766A, 766B and 766C in the depicted embodiment, with each availability container comprising some number of DAG node hosts 710. Node host 710A of availability container 766A, for example, comprises a DAG node 722A, local persistent storage (e.g., one or more disk-based devices) 730A, and a proxy 712A that may be used as a front end for communications with clients of the storage system. Similarly, node host 710B in availability container 766B comprises DAG node 722B, local persistent storage 730B, and a proxy 712B, and node host 710C in availability container 766C includes DAG node 722C, local persistent storage 730C and a proxy 712C. In the depicted embodiment, DAG nodes 722 (and/or proxies 712) may each comprise one or more threads of execution, such as a set of one or more processes. The local persistent storage devices 730 may be used to store transition records as they are propagated along replication path 791 (and/or DAG configuration-delta message contents received at the DAG nodes 722) in the depicted embodiment.

The log configuration manager (LCM) of the DAG depicted in the embodiment of FIG. 7 itself comprises a plurality of nodes distributed across multiple availability containers. As shown, a consensus-based LCM cluster 790 may be used, comprising LCM node 772A with LCM storage 775A located in availability container 766A, and LCM node 772B with LCM storage 775B located in availability container 766B. The depicted LCM may thus be considered fault-tolerant, at least with respect to failures that do not cross availability container boundaries. The nodes of such a fault-tolerant LCM may be referred to herein as "configuration nodes", e.g., in contrast to the member nodes of the DAG being managed by the LCM. Changes to the DAG configuration (including, for example, node removals, additions or role changes) may be approved using a consensus-based protocol among the LCM nodes 772. Representations of the DAG configuration may have to be stored in persistent storage by a plurality of LCM nodes before the corresponding configuration-delta messages are transmitted to the DAG nodes 722. The number of availability containers used for the LCM and/or for a given replication DAG may vary in different embodiments and for different applications, depending for example on the availability requirements or data durability requirements of the applications.

Partition-Based Cross-Data-Store Transaction Management

Figure 8:
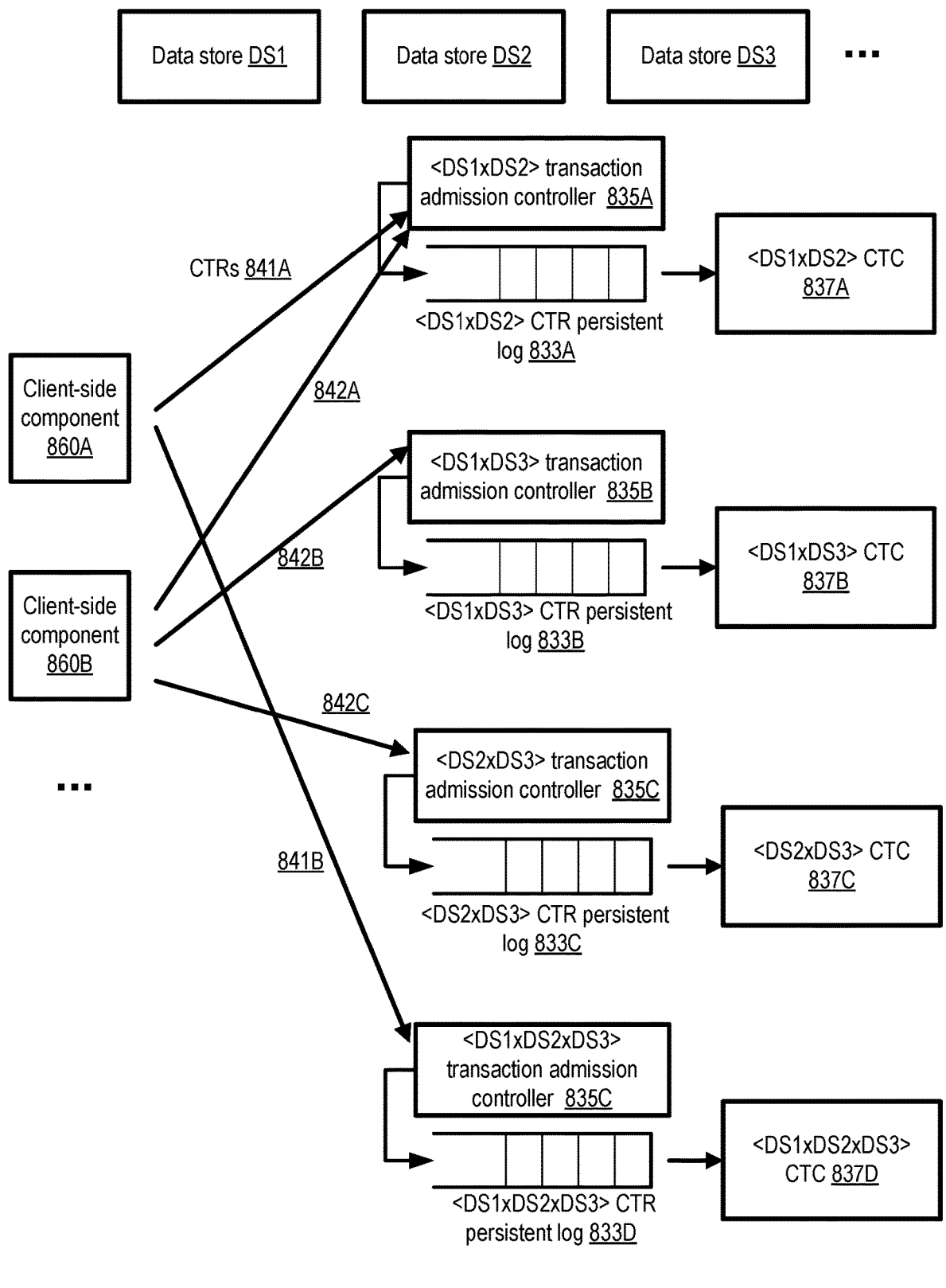
FIG. 8 illustrates an example of a distributed transaction management architecture in which a plurality of transaction coordinators may be configured, with each coordinator responsible for managing cross-data-store transactions directed to a respective combination of data stores, according to at least some embodiments.

In some embodiments, as mentioned earlier, a cross-data-store transaction coordinator (CTC) may wait until the distributed commit protocol for one transaction is complete before initiating the distributed commit protocol processing for the next transaction request in the CTR persistent log. Such an approach may be used, for example, to ensure that at least with respect to cross-data-store transactions, sequential consistency is enforced at the storage system. However, depending on the number of data stores in the system and the nature of the cross-data-store transactions (i.e., which combinations of data stores are modified in various transactions), an approach that uses multiple CTCs may be more efficient. FIG. 8 illustrates an example of a distributed transaction management architecture in which a plurality of transaction coordinators may be configured, with each coordinator responsible for managing cross-data-store transactions directed to a respective combination of data stores, according to at least some embodiments.

In the depicted embodiment, client-side components 860 (such as 860A or 860B) may generate cross-data-store transaction requests, each directed at some subset of data stores DS1, DS2 and DS3 of a distributed storage system. However, instead of directing all the CTRs to a single admission controller, the client-side components may select one of four admission controllers 835A-835D for any given CTR, depending on which combination of data stores is being read and/or modified in the transaction request. Admission controller 835A, associated persistent log 833A and CTC 837A may be established to manage transactions that involve the combination of DS1 and DS2 in the depicted embodiment. Similarly, for transactions that read or write to the combination of DS1 and DS3, admission controller 835B, log 833B and CTC 837B may be used, and for transactions that involve DS2 and DS3, admission controller 835C, log 833C and CTC 837C may be configured in the depicted embodiment. Finally, for transactions that read and/or write data at all three data stores, admission controller 835D, log 833D and CTC 837D may be used. In at least one embodiment, the CTC responsible for transactions directed to a given combination of data stores may be able to process more than one such transaction at a time under some conditions, instead of dealing with such transactions in strict sequence (in a manner similar to that described earlier for overlapping processing of CTRs in implementations in which a single persistent log is used for all combinations of data stores). For example, CTC 837A may be able to detect, upon examining a set of two or more CTRs in log 833A, that the CTRs of the set do not conflict with each other, and may therefore proceed with the distributed commit protocols for several or all of the transactions of the set in parallel.

Such deployment of respective sets of distributed transaction management resources for different combinations of data stores may be advantageous in that the amount of time that a given CTR has to wait in a persistent log, before the distributed commit protocol for the CTR is begun, may thereby be reduced. For example, consider a scenario in which CTR1 involving DS1, DS2 and DS3 is ready for admission control at a time T0, and that a different request CTR2, which involves only DS1 and DS2, is ready for admission control a short time later, e.g., at T0+delta1. Assume that it takes time Tproc for the processing of the distributed transaction protocol for CTR1, where Tproc is much larger than delta1. If a single persistent log and a single CTC were being used, then the first phase of CTR2's distributed commit protocol processing may not even be begun until T0+Tproc: that is, for (Tproc-delta1), no progress may be made on CTR2. If, instead, the partitioned approach to distributed transaction illustrated in FIG. 8 is used, the processing of CTR2 may be begun much sooner (e.g., by CTC 837A) in parallel with CTR1's processing (which may be handled by CTC 837D).

Parallelized handling of the distributed transactions, conceptually similar to the approach illustrated in FIG. 8, may be implemented in other ways in different embodiments. In some embodiments, for example, a single admission controller may still be used, or a single persistent log may still be deployed, while distributing the commit protocol workload among several different coordinators. In some embodiments in which the storage system comprises a large number of data stores, separate sets of CTR management resources need not be set up for all the different combinations of data stores—instead, some CTCs (with associated persistent logs and/or admission controllers) may be established to handle more than one combination of data store. Consider a storage system comprising four data stores DS1-DS4, so that 11 data store combinations are possible (6 combinations involving two data stores each, 4 involving three data stores each, and one involving all four data stores). In one embodiment, the 11 combinations may be mapped to just three CTCs: CTC1 responsible for (DS1×DS2), (DS1×DS3) and (DS1×DS4), CTC2 responsible for (DS2×DS3), (DS2×DS4) and (DS3×DS4), and CTC3 responsible for the three-data-store combinations and the four-data-store combination.

Methods for Supporting Distributed Transactions Using Persistent Change Logs

Figure 9:
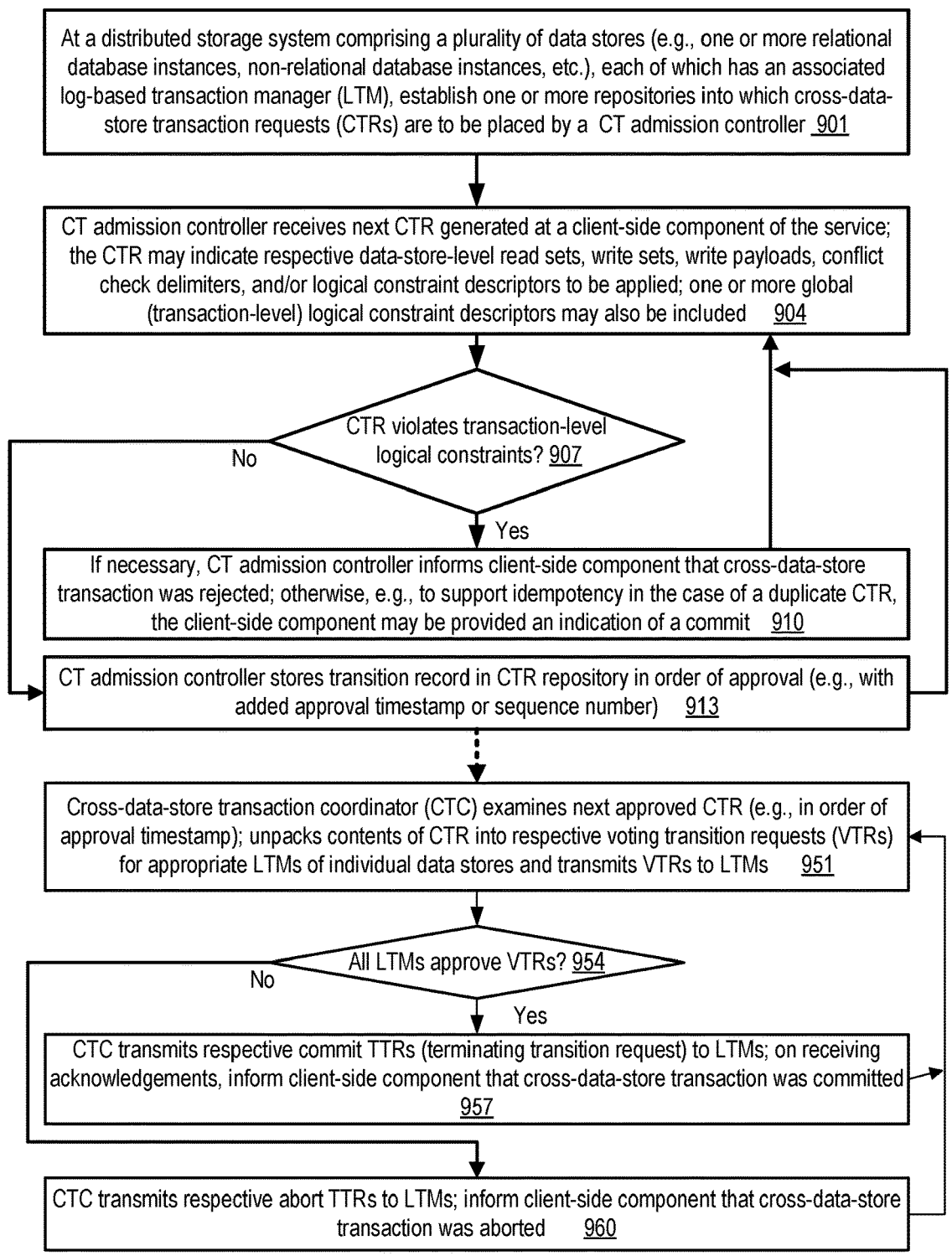
FIG. 9 is a flow diagram illustrating aspects of operations that may be performed by cross-data-store transaction admission controllers and coordinators, according to at least some embodiments.

FIG. 9 is a flow diagram illustrating aspects of operations that may be performed by cross-data-store transaction admission controllers and coordinators, according to at least some embodiments. As shown in element 901, one or more repositories for cross-data-store transaction requests (CTRs) may be established at a distributed storage system comprising a plurality of data stores with respective log-based transaction managers (LTMs). An admission controller may be configured for making decisions as to which CTRs should be added or inserted into the repository. In some embodiments, the repositories may themselves be log-structured, similar to the persistent logs used for storing state transition records at the individual data stores. In other embodiments, other storage mechanisms (such as implementations of FIFO queues or linked lists) may be used for the CTR repositories.

As indicated in element 904, an admission controller may receive a CTR from a client-side component of the system, e.g., via a programmatic interface exposed as a client library of the distributed transaction management environment. The CTR may comprise some combination of data-store-level elements (such as, for one or more data stores, respective read set descriptors, write set descriptors, conflict-check delimiters, logical constraint descriptors comprising exclusion signatures or required signatures) and/or transaction-level elements (e.g., de-duplication or sequencing constraint descriptors for the transaction as a whole) in the depicted embodiment. In some embodiments, the admission controller may perform one or more checks to determine whether the CTR is to be accepted for further processing: e.g., if any global logical constraint descriptors are included in the CTR, the admission controller may verify that the constraints would not be violated if the CTR were to be accepted. To do so, the admission controller may, for example, examine at least a subset of the transition records stored in the CTR persistent log, comparing exclusion signatures of the CTR with de-duplication signatures of the previously-stored log records to identify duplicates, and comparing required signatures of the CTR with sequencing signatures of the previously-stored log records to verify commit sequencing.

If the CTR does not violate any of the constraints checked by the admission controller (as indicated in element 907), a transition record indicating that the CTR has been accepted for processing may be added to the persistent log (element 913). In at least some implementations, a logical timestamp or sequence number indicative of the order in which the CTR was approved relative to other CTRs may be included in the transition record, in addition to some or all of the data-store-specific elements included in the CTR. If the CTR cannot be accepted, e.g., due to a constraint violation, different actions may be taken depending on the nature of the violation and the idempotency policies being supported. In some cases, as indicated in element 910, a message indicating that the CTR has been rejected may be transmitted to the client-side component. In other cases, e.g., if the CTR was identified as representing a duplicate of an earlier-committed transaction and if idempotency for such duplicate requests is being supported, an indication that the CTR was committed may be provided to the client-side component by the admission controller. Regardless of whether the CTR was approved or rejected, the admission controller may then wait for subsequent CTRs, and repeat the operations corresponding to elements 904 onwards for the next CTR received. It is noted that some CTRs may not include transaction-level or global logical constraints, in which case the admission controller may not have to perform any constraint-checking, and may simply insert corresponding transition records into the CTR persistent log.

In the depicted embodiment, a CTC may be assigned to examine entries of the persistent log (e.g., in insertion or FIFO order) and initiate distributed commit protocol processing for each entry examined. During each iteration of its operations, the CTC examine the next CTR transition record (i.e., the most recent record that has not yet been examined) in the CTR persistent log (element 951). To start the first phase of the distributed commit protocol, the CTC may unpack or extract the data-store-specific elements (read sets, write sets, etc.) of the CTR, and generate respective VTRs (voting transition requests) for the one or more data stores to which the operations of the CTR are directed. The VTRs may then be transmitted to the LTMs of the respective data stores. The CTC may then wait to receive responses to the VTRs from the LTMs to complete the first phase of the commit protocol for the CTR being processed. In other embodiments, as discussed earlier, the CTC may schedule the distributed commit protocol operations for more than one CTR in parallel (e.g., if the CTC is able to verify that the CTRs do not conflict with one another) instead of processing the log entries in strict sequential order.

During the second phase of the commit protocol, the CTC may transmit one of two types of terminating transition requests (TTRs) to the LTMs of the data stores. If all the responses from the data store LTMs indicate that the VTRs were conditionally approved (as detected in element 954), the CTC may send a commit TTR to each LTM (element 957) to indicate that the modifications indicated in the corresponding VTR are to be made permanent. In contrast, if one or more of the LTMs reject their VTR (as also detected in element 954), the CTC may send an abort TTR to each LTM (element 960) to indicate (to those LTMs that may have conditionally accepted their VTRs) that the modifications indicated in the VTRs are not to be made permanent. In at least one implementation, the CTC may treat the sustained absence of a response to a VTR from an LTM as the equivalent of a rejection—e.g., if a timeout period associated with a VTR expires and a particular LTM has not yet responded, the CTC may send abort TTRs to one or more of the LTMs. In some embodiments, the second phase of the commit protocol may be considered complete when a respective response (e.g., an acknowledgement) of the TTR is received from each LTM. In such embodiments, the CTC may provide an indication of the disposition of the CTR to the client-side component (e.g., whether the transaction was aborted or committed). The CTC may then examine the persistent log to begin the next iteration of its processing, and repeat operations corresponding to elements 951 onwards for the next CTR examined.

Figure 10:
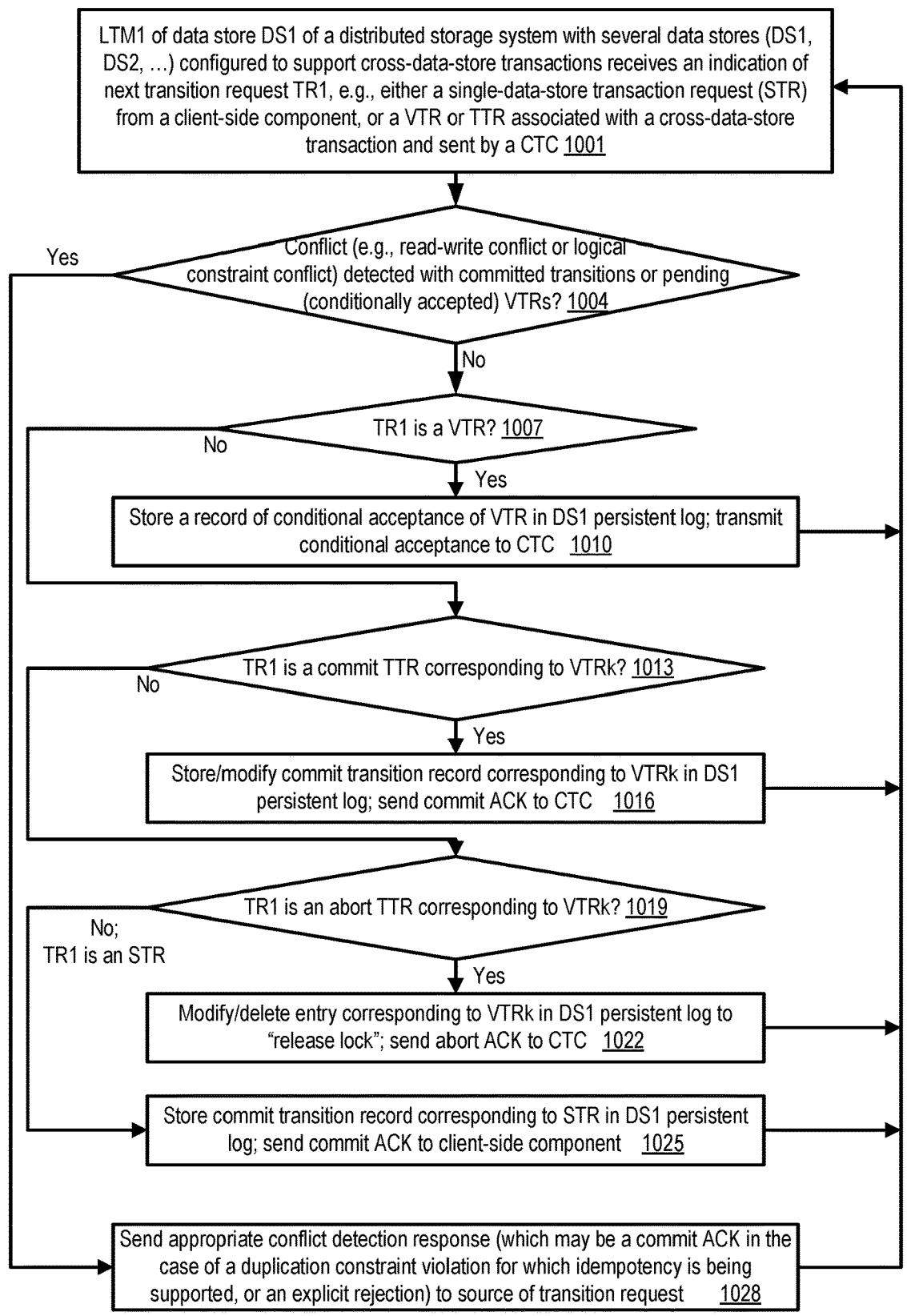
FIG. 10 is a flow diagram illustrating aspects of operations that may be performed by a log-based transaction manager associated with a data store supporting distributed transactions, according to at least some embodiments.

FIG. 10 is a flow diagram illustrating aspects of operations that may be performed by a log-based transaction manager (LTM) associated with a data store supporting distributed transactions, according to at least some embodiments. A particular LTM, LTM1, may be established for handling state transition requests directed to a particular data store DS1 of a distributed storage system comprising a plurality of data stores. As indicated in element 1001, LTM1 may receive an indication of a particular transition request TR1, which may comprise either a single-data-store transaction request (STR) submitted by a client-side component of the system, or one of two types of transition requests (VTRs or TTRs) submitted by a cross-data-store transaction coordinator (CTC).

In the depicted example, TR1 may include elements (e.g., a read set descriptor, a write set descriptor and/or a conflict check delimiter) that can be used to determine whether a read-write conflict exists between TR1 and previously-stored records of the LTN's persistent log. For example, TR1's read set may indicate one or more objects that were read in order to determine the contents of the TR1 write set (or write payload), and TR1's read-write conflict check delimiter may indicate a sequence number corresponding to a committed state of DS1 at the time that the one or more objects were read. In one embodiment, if any writes directed to the read set subsequent to the sequence number indicated as the conflict check delimiter have been accepted (either conditionally or unconditionally), a determination may be made by the LTM that a read-write conflict has been detected. Similarly, logical constraint descriptors of the kinds described earlier (e.g., de-duplication constraint descriptors or sequencing constraint descriptors) may contain exclusion signatures, required signatures, and constraint-checking delimiters that may be usable by the LTM, together with at least a subset of previously-stored unconditional or conditional transition records) to determine whether TR1 violates a logical constraint in the depicted embodiment. If either a read-write conflict or a logical constraint violation is detected with respect to TR1 (as determined in element 1004), a selected type of conflict detection response may be sent to the source of TR1 (the client-side component if TR1 were an STR, or a CTC if TR1 were a VTR or TTR) in the depicted embodiment (element 1028). The response may be an explicit rejection, e.g., if a read-write conflict were detected, a sequencing constraint violation were detected, or if a policy to respond to duplicate TRs with explicit rejections were in use. If duplicate transition requests are to be handled in accordance with idempotency semantics, a commit ACK corresponding to a duplicate TR may be sent to the source of TR1 instead of a rejection.

If no conflict or constraint violation is detected (as also determined in element 1004), different operations may be performed depending on whether TR1 is an STR, a VTR or a TTR in the depicted embodiment. If TR1 is a VTR (as determined in element 1007), a transition record indicative of conditional acceptance of the VTR may be added to the LTM's persistent log (element 1010), and an indication of the conditional acceptance may be provided to the source CTC from which the VTR was received. As indicated earlier, the conditional acceptance may be considered the logical equivalent of acquiring a lock on the read/write sets of the VTR. Any new VTRs or STRs that are received prior to the corresponding TTR may be rejected if the new VTR/STR conflicts with the conditionally-accepted VTR (or other records of the persistent log) in the depicted embodiment.

If TR1 is a commit TTR corresponding to an earlier-stored conditional acceptance transition record for some VTR (VTRk) (as determined in element 1013), the LTM may modify the conditionally-accepted transition record (or store a new commit transition record) in its persistent log to indicate that the writes of VTRk are being committed (element 1016). In some embodiments, an acknowledgement of the commit TTR may be sent to the source CTC from which the commit TTR was received.

If TR1 is an abort TTR corresponding to an earlier-stored conditional acceptance transition record for some VTR (VTRk) (as determined in element 1019), the LTM may modify the persistent log to indicate that the writes of VTRk have been rejected (element 1022), and that the corresponding logical lock is to be released. In some embodiments, the conditional acceptance record of VTRk may simply be deleted from the persistent log, while in other embodiments a field within the transition record may be modified to indicate that the transaction corresponding to VTRk has been aborted. An abort acknowledgement response may be sent to the CTC in some embodiments.

If TR1 is an STR (as would be the case if it is neither a VTR nor a TTR, which would also be ultimately determined in operations corresponding to element 1019), a commit transition record representing the writes of STR1 may be stored in the persistent log of the LTM (element 1025). In some embodiments, a response may be provided to the client-side component from which the STR was received to indicate that the STR has been approved. In at least some embodiments in which a replication DAG is used to implement the persistent logs used by the LTMs and the CTCs, a sufficient number of replicas of the state transition records may have to be stored to persistent storage before the transition is considered effective.

It is noted that in various embodiments, operations other than those illustrated in the flow diagrams of FIG. 9 and FIG. 10 may be used to implement at least some of the techniques for supporting distributed transactions discussed herein. Some of the operations shown may not be implemented in some embodiments, may be implemented in a different order than illustrated in FIG. 9 or FIG. 10, or in parallel rather than sequentially.

Use Cases

The techniques described above, of providing support for distributed transactions that span multiple data stores may be useful in a variety of scenarios. In some provider network environments, many different types of storage and/or database architectures may be supported. One or more of the databases or storage services may not even provide support for atomic multi-write transactions, while others may support transactions with several writes only if all the writes of a given transaction are directed to a single database instance. In at least some provider networks, internal-use-only applications developed for administering the resources (e.g., guest virtual machines and physical machines used at a virtual computing service, or network configurations of various types) of the provider network may themselves require atomicity for groups of operations that span different internal data stores. In addition, various applications developed by provider network customers may also be designed to utilize a variety of data stores, such as a mix of relational and non-relational databases. The ability to interact with several different data stores with respective data models and/or programmatic interfaces may be especially valuable as applications scale to larger customer sets and data sets than can be supported by single-instance databases. Providing built-in robust transaction support for arbitrary combinations of data stores may help attract additional customers to the provider network, and may also improve the ease of administration of network resources.

Illustrative Computer System

Figure 11:
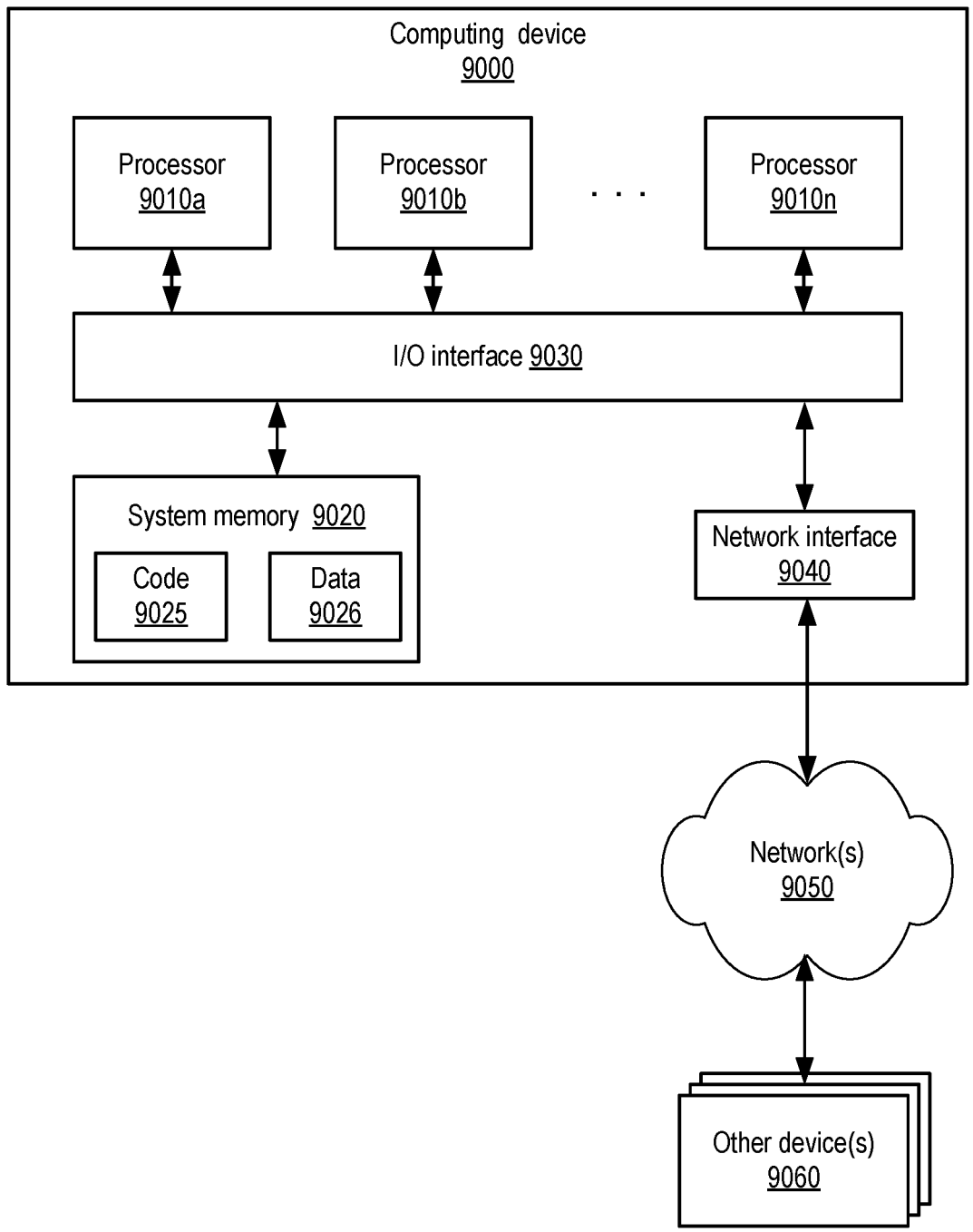
FIG. 11 is a block diagram illustrating an example computing device that may be used in at least some embodiments.

In at least some embodiments, a server that implements one or more of the techniques described above for supporting distributed or cross-data-store transactions may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. One or more non-transitory computer-accessible storage media storing program instructions that when executed on or across one or more processors:
   in response to receiving a voting transition request indicating a particular write operation directed to a data store,
      determine, based on an examination of a read set indicated in the voting transition request and at least a subset of entries of a persistent log, that the voting transition request is to be conditionally accepted pending a receipt of a terminating transition request corresponding to the voting transition request; and
      store a particular entry in the persistent log indicative of conditional acceptance of the particular write operation of the voting transition request;
   in response to receiving, prior to the receipt of the terminating transition request, a single-data-store transaction request,
      determine, based on a detection of a read-write conflict between a read set indicated in the single-data-store transaction request and at least the particular entry, that the single-data-store transaction request is to be rejected; and
   in response to receiving the terminating transition request, determine whether to modify the persistent log to indicate that the particular write operation is to be committed.

2. The one or more non-transitory computer-accessible storage media as recited in claim 1, wherein the data store comprises one of: a non-relational database system, a relational database system, a storage service that implements a web services interface allowing access to unstructured data objects, an in-memory database, or an instance of a distributed cache.

3. The one or more non-transitory computer-accessible storage media as recited in claim 1, wherein the voting transition request includes a conflict check delimiter, and the program instructions are further executable to utilize the conflict check delimiter to select one or more entries of the persistent log to be examined to determine whether the voting transition request is to be accepted.

4. The one or more non-transitory computer-accessible storage media as recited in claim 1, wherein the voting transition request includes a logical constraint descriptor comprising one or more of: an exclusion signature or a required signature, and the program instructions are further executable to determine, based at least in part on the logical constraint descriptor, whether the voting transition request is to be accepted.

5. The one or more non-transitory computer-accessible storage media as recited in claim 1, wherein:
the persistent log comprises a plurality of replica nodes within respective availability containers of a provider network; and
the program instructions are further executable to store, prior to receiving an indication of the termination status, a respective replica of at least a portion of the voting transition request at individual ones of the plurality of replica nodes.

6. The one or more non-transitory computer-accessible storage media as recited in claim 1, wherein responsive to said determine that the single-data-store transaction request is to be rejected, the program instructions are further executable to send a conflict detection response to the source of the voting transition request.

7. The one or more non-transitory computer-accessible storage media as recited in claim 1, wherein:
the terminating transition request indicates a commit or abort decision; and
the single-data-store transaction request is a request directed to a single member data store and is submitted by a client-side component.

8. A system, comprising:
one or more computing devices comprising one or more processors and memory and configured to implement at least one log-based transaction manager configured to:
in response to receiving a voting transition request indicating a particular write operation directed to a data store,
determine, based on an examination of a read set indicated in the voting transition request and at least a subset of entries of a persistent log, that the voting transition request is to be conditionally accepted pending a receipt of a terminating transition request corresponding to the voting transition request; and
store a particular entry in the persistent log indicative of conditional acceptance of the particular write operation of the voting transition request; and
in response to receiving, prior to the receipt of the terminating transition request, a single-data- store transaction request,
determine, based on a detection of a read-write conflict between a read set indicated in the single-data- store transaction request and at least the particular entry, that the single-data- store transaction request is to be rejected; and
in response to receiving the terminating transition request, determine whether to modify the persistent log to indicate that the particular write operation is to be committed.

9. The system of claim 8, further comprising:
the data store, wherein the data store comprises one of: a non-relational database system, a relational database system, a storage service that implements a web services interface allowing access to unstructured data objects, an in-memory database, or an instance of a distributed cache.

10. The system of claim 8, wherein the voting transition request includes a conflict check delimiter, and the at least one log-based transaction manager is configured to utilize the conflict check delimiter to select one or more entries of the persistent log to be examined to determine whether the voting transition request is to be accepted.

11. The system of claim 8, wherein the voting transition request includes a logical constraint descriptor comprising one or more of: an exclusion signature or a required signature, and the at least one log-based transaction manager is configured to determine, based at least in part on the logical constraint descriptor, whether the voting transition request is to be accepted.

12. The system of claim 8, wherein responsive to said determine that the single-data- store transaction request is to be rejected, the at least one log-based transaction manager is configured to send a conflict detection response to the source of the voting transition request.

13. The system of claim 8, wherein:
the at least one log-based transaction manager is configured to handle duplicate transition requests in accordance with idempotency semantics; and
responsive to said determine that the single-data- store transaction request is to be rejected, the at least one log-based transaction manager is configured to send a commit ACK corresponding to a duplicate transition request to the source of the voting transition request.

14. The system of claim 8, wherein:
the terminating transition request indicates a commit or abort decision;
the single-data-store transaction request is a request directed to a single member data store and is submitted by a client-side component of the system.

15. A method, comprising:
performing, by at least one log-based transaction manager:
in response to receiving a voting transition request indicating a particular write operation directed to a data store,
determining, based on an examination of a read set indicated in the voting transition request and at least a subset of entries of a persistent log, that the voting transition request is to be conditionally accepted pending a receipt of a terminating transition request corresponding to the voting transition request; and
storing a particular entry in the persistent log indicative of conditional acceptance of the particular write operation of the voting transition request; and
in response to receiving, prior to the receipt of the terminating transition request, a single-data- store transaction request, determining, based on a detection of a read-write conflict between a read set indicated in the single-data-store transaction request and at least the particular entry, that the single-data-store transaction request is to be rejected; and in response to receiving the terminating transition request, determining whether to modify the persistent log to indicate that the particular write operation is to be committed.

16. The method of claim 15, wherein the data store comprises one of: a non-relational database system, a relational database system, a storage service that implements a web services interface allowing access to unstructured data objects, an in-memory database, or an instance of a distributed cache.

17. The method of claim 15, wherein:

the voting transition request includes a conflict check delimiter, and the method further comprises utilizing the conflict check delimiter to select one or more entries of the persistent log to be examined to determine whether the voting transition request is to be accepted.

18. The method of claim 15, wherein:

the voting transition request includes a logical constraint descriptor comprising one or more of: an exclusion signature or a required signature; and the method further comprises determining, based at least in part on the logical constraint descriptor, whether the voting transition request is to be accepted.

19. The method of claim 15, wherein the method further comprises:

sending, responsive to said determining that the single-data-store transaction request is to be rejected, a conflict detection response to the source of the voting transition request.

20. The method of claim 15, wherein:

the at least one log-based transaction manager is configured to handle duplicate transition requests in accordance with idempotency semantics; and the method further comprises, responsive to said determine that the single-data-store transaction request is to be rejected, sending a commit ACK corresponding to a duplicate transition request to the source of the voting transition request.

* * * * *